US012810898B2

(12) United States Patent
Li et al.

(10) Patent No.: US 12,810,898 B2
(45) Date of Patent: Nov. 24, 2026

(54) VIDEO PROCESSING METHOD AND APPARATUS

(71) Applicant: Tencent Technology (Shenzhen) Company Limited, Shenzhen (CN)

(72) Inventors: Peng Li, Shenzhen (CN); Xuanying Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/983,275

(22) Filed: Dec. 16, 2024

(65) Prior Publication Data

US 2025/0118337 A1 Apr. 10, 2025

Related U.S. Application Data

(63) Continuation of application No. PCT/CN2023/110290, filed on Jul. 31, 2023.

(30) Foreign Application Priority Data

Sep. 7, 2022 (CN) ........................ 202211090054.2

(51) Int. Cl.
*H04N 7/00* (2011.01)
*G11B 27/031* (2006.01)

(52) U.S. Cl.
CPC .................................. *G11B 27/031* (2013.01)

(58) Field of Classification Search
USPC ........................................................ 386/280
See application file for complete search history.

(56) References Cited

U.S. PATENT DOCUMENTS 7,432,939 B1 * 10/2008 Platzer .................... G06T 11/00 715/823
8,784,199 B1 * 7/2014 Henrick ................ A63F 13/352 463/30

(Continued)

FOREIGN PATENT DOCUMENTS

CN 107770618 A 3/2018
CN 112070863 A 12/2020
CN 113645469 A 11/2021

OTHER PUBLICATIONS

International Search Report and Written Opinion received for PCT Patent Application No. PCT/CN2023/110290, mailed on Oct. 26, 2023, 13 pages (5 pages of English Translation and 8 pages of Original copy attached).

*Primary Examiner* — Nigar Chowdhury
(74) *Attorney, Agent, or Firm* — ARENTFOX SCHIFF LLP

(57) ABSTRACT

In a video processing method, the method includes obtaining color information and transparency information of each pixel in a video frame. A color picture of the video frame is generated based on the color information of each pixel and a transparency picture of the video frame is generated based on the transparency information of each pixel. The spliced picture is obtained based on the color picture and the transparency picture of each video frame according to preset configuration information. Video conversion processing is performed on the spliced picture to obtain a transparency spliced video. Special effect video is rendered based on the preset configuration information and the transparency spliced video to obtain a transparency special effect video. The transparency special effect video is applied to a specific position of an application in response to a special effect triggering operation.

9 Claims, 10 Drawing Sheets

(56) References Cited

U.S. PATENT DOCUMENTS

| | | | | | |
|---|---|---|---|---|---|
| 10,834,158 | B1 * | 11/2020 | Bourgoyne | G06F 21/1083 | |
| 11,170,533 | B1 * | 11/2021 | Hillman | G06T 9/00 | |
| 11,425,283 | B1 * | 8/2022 | Thurston, III | G06T 7/13 | |
| 12,444,126 | B1 * | 10/2025 | Tremblay | G06T 15/506 | |
| 2005/0054423 | A1 * | 3/2005 | Wadleigh | G07F 17/32 | 463/20 |
| 2007/0018997 | A1 * | 1/2007 | Edwards | A63F 13/00 | 345/605 |
| 2007/0060345 | A1 * | 3/2007 | Edwards | A63F 13/45 | 463/31 |
| 2007/0060346 | A1 * | 3/2007 | Edwards | A63F 13/30 | 463/31 |
| 2007/0283289 | A1 * | 12/2007 | Greve | G06F 3/0481 | 345/592 |
| 2008/0001960 | A1 * | 1/2008 | Chen | G06T 15/04 | 345/582 |
| 2008/0309676 | A1 * | 12/2008 | Nehab | G06T 9/00 | 345/611 |
| 2009/0115901 | A1 * | 5/2009 | Winter | H04N 21/4312 | 348/565 |
| 2009/0232458 | A1 * | 9/2009 | Hess | G02B 6/2553 | 385/95 |
| 2010/0315215 | A1 * | 12/2010 | Yuda | H04N 23/58 | 340/435 |
| 2012/0050309 | A1 * | 3/2012 | Tsuchida | G09G 5/377 | 345/592 |
| 2012/0189273 | A1 * | 7/2012 | Folgner | H04N 21/252 | 386/E9.011 |
| 2013/0135339 | A1 * | 5/2013 | Saini | G09G 5/026 | 345/613 |
| 2013/0155325 | A1 * | 6/2013 | Ramamurthy | H04N 5/45 | 348/565 |
| 2014/0152875 | A1 * | 6/2014 | Tobin | H04N 23/62 | 348/239 |
| 2014/0267563 | A1 * | 9/2014 | Baca | H04N 21/237 | 348/14.08 |
| 2015/0078733 | A1 * | 3/2015 | Popkiewicz | G06Q 30/02 | 386/278 |
| 2015/0195544 | A1 * | 7/2015 | Dev | H04N 19/182 | 375/240.26 |
| 2016/0292827 | A1 * | 10/2016 | Holland | G06T 3/4023 | |
| 2016/0295287 | A1 * | 10/2016 | Jiang | H04N 21/41407 | |
| 2017/0228905 | A1 * | 8/2017 | Dabrowski | G06T 11/00 | |
| 2017/0244908 | A1 * | 8/2017 | Flack | G11B 27/036 | |
| 2018/0077469 | A1 * | 3/2018 | Geduldig | H04N 21/4316 | |
| 2019/0102935 | A1 * | 4/2019 | Neulander | G02B 27/0172 | |
| 2019/0230382 | A1 * | 7/2019 | Wang | H04N 21/8146 | |
| 2019/0251729 | A1 * | 8/2019 | Safdarnejad | G06T 7/97 | |
| 2019/0379876 | A1 * | 12/2019 | Hur | H04N 13/178 | |
| 2020/0036983 | A1 * | 1/2020 | Wang | H04N 19/157 | |
| 2020/0193693 | A1 * | 6/2020 | Thangaraj | G06T 15/205 | |
| 2020/0258306 | A1 * | 8/2020 | Forutanpour | G01S 5/0072 | |
| 2020/0351467 | A1 * | 11/2020 | Zhou | H04N 5/2621 | |
| 2022/0417591 | A1 * | 12/2022 | Xiao | G11B 27/031 | |
| 2023/0377250 | A1 * | 11/2023 | Butyn | G06T 15/205 | |

* cited by examiner

VIDEO PROCESSING METHOD AND APPARATUS

RELATED APPLICATIONS

The present application is a continuation of International Application No. PCT/CN2023/110290, filed on Jul. 31, 2023, which claims priority to Chinese Patent Application No. 202211090054.2, filed on Sep. 7, 2022. The entire disclosures of the prior applications are hereby incorporated by reference.

FIELD OF THE TECHNOLOGY

Embodiments of this disclosure relate to the field of internet technologies, including a video processing method and apparatus, an electronic device, a computer-readable storage medium, and a computer program product.

BACKGROUND OF THE DISCLOSURE

In the related art, when a specific effect video is produced, the video is generally produced by using code, or is produced by playing a special effect in a manner of a dynamic picture (for example, an animation special effect) or playing a video. Dynamic pictures are generally produced by using a Lottie animation, a Graphics Interchange Format (GIF) animation, an Animated Portable Network Graphics (APNG) animation, videos in a web based content (e.g., WebP) format and an MP4 format, and the like.

However, the foregoing code implementation is time-consuming and laborious, and a large amount of special effect code needs to be written to produce the video. In dynamic picture production, software decoding is generally supported, and a produced animation special effect has a problem of unclear boundaries such as noise. In addition, a file of the animation special effect is large, and occupies large memory overheads. The manner of playing the video does not support transparency. Therefore, a played special effect video cannot be completely fused into a background image of a current screen.

In the related art, special effect video production and a playing solution both have problems such as inconvenient production manners, low restoration of the special effect, and large memory overheads.

SUMMARY

Embodiments of this disclosure provide a video processing method and apparatus, an electronic device, a non-transitory computer-readable storage medium, and a computer program product. The embodiments are applicable to at least the field of animation production and the field of special effect video processing. In this case, production of a special effect video can be simplified, and transparency information of the special effect video is supported. Therefore, a special effect in an original special effect video when a transparency special effect video is played is restored, and memory usage is reduced when the transparency special effect video is produced.

An embodiment of this disclosure provides a video processing method, the method includes obtaining color information of each pixel and transparency information of each pixel in a video frame of a video. A color picture corresponding to the video frame is generated based on the color information of each pixel in the video frame and a transparency picture corresponding to the video frame is generated based on the transparency information of each pixel in the video frame. At least one spliced picture is obtained based on splicing processing of the color picture and the transparency picture of each video frame according to preset configuration information. Video conversion processing is performed on the at least one spliced picture to obtain a transparency spliced video. Special effect video is rendered based on the preset configuration information and the transparency spliced video to obtain a transparency special effect video. The transparency special effect video is applied to a specific position of an application in response to a special effect triggering operation.

An embodiment of this disclosure provides a video processing apparatus, the apparatus includes processing circuitry configured to obtain color information of each pixel and transparency information of each pixel in a video frame of a video. A color picture corresponding to the video frame is generated based on the color information of each pixel in the video frame. A transparency picture corresponding to the video frame is generated based on the transparency information of each pixel in the video frame. The processing circuitry configured to obtain at least one spliced picture based on splicing processing of the color picture and the transparency picture of each video frame according to preset configuration information. The processing circuitry configured to perform video conversion processing on the at least one spliced picture, to obtain a transparency spliced video. The processing circuitry configured to perform special effect video rendering based on the preset configuration information and the transparency spliced video, to obtain a transparency special effect video. The processing circuitry configured to apply the transparency special effect video to a specific position of an application in response to a special effect triggering operation.

An embodiment of this disclosure provides an electronic device, including a memory, configured to store executable instructions; and a processor, configured to implement the video processing method when executing the executable instructions stored in the memory.

An embodiment of this disclosure provides a computer program product or a computer program, the computer program product and the computer program including executable instructions, the executable instructions being stored in a computer-readable storage medium, and a processor of an electronic device implement the video processing method when reading the executable instructions from the computer-readable storage medium and executing the executable instructions.

An embodiment of this disclosure provides a non-transitory computer-readable storage medium, having executable instructions stored therein, and cause a processor to perform the video processing method when executing the executable instructions.

The embodiments of this disclosure have the following beneficial effects: for each original video frame in an original special effect video, a color picture corresponding to the original video frame is drawn based on color channel information of each pixel point in the original video frame respectively; a transparency picture corresponding to the original video frame is drawn based on transparency channel information of each pixel point in the original video frame, and splicing processing is performed on the color picture and the transparency picture, to obtain at least one spliced picture. In this way, because the spliced picture includes both the color channel information of the original video frame and the transparency channel information of the original video frame, a generated transparency spliced video also carries the transparency information of the original special effect video, so that when special effect video rendering is performed, a transparency special effect video can be obtained through rendering based on the transparency information, and the effect of the special effect in the original special effect video can be highly restored when the transparency special effect video is played. In addition, because there is no need to write code to produce the special effect, production costs of the transparency special effect video and memory usage during production are greatly reduced.

DETAILED DESCRIPTION

Figure 1:
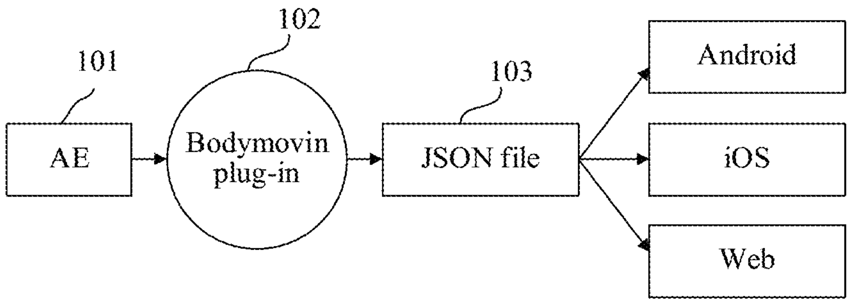
FIG. 1 is a schematic diagram of an implementation process for producing a dynamic picture by using Lottie animation.

To make objectives, technical solutions, and advantages of this disclosure clearer, the following further describes this disclosure in detail with accompanying drawings. The described embodiments do not be construed as limitation on this disclosure. Other embodiments obtained by a person of ordinary skill in the art based on the embodiments of this disclosure without creative efforts shall fall within the protection scope of this disclosure.

"Some embodiments" involved in the following description describes a subset of all possible embodiments. However, "some embodiments" may be same or different subsets of all the possible embodiments, and may be combined with each other when there is no conflict. Unless otherwise defined, meanings of all technical and scientific terms used in the embodiments of this disclosure are the same as those usually understood by a person skilled in the art to which the embodiments of this disclosure belongs. Terms used in the embodiments of this disclosure are merely intended to describe objectives of the embodiments of this disclosure, but are not intended to limit this disclosure. The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

Examples of terms involved in the embodiments of the disclosure are briefly introduced. The descriptions of the terms are provided as examples only and are not intended to limit the scope of the disclosure.

(1) An alpha blending technology is an overall technical solution for generating a transparency special effect video in the embodiments of this disclosure.

(2) Alpha blending effects are some case effects made by using the method in the embodiments of this disclosure.

(3) A light and shadow special effect is a light and shadow display effect in a display interface (for example, a game interface).

(4) A particle special effect is a dynamic effect of many small objects in the display interface (for example, the game interface).

(5) Hard decoding, that is, hardware decoding, is a manner of video decoding, and refers to decoding by using a dedicated hardware device, for example, a mobile phone hardware device such as a graphics processing unit (GPU), and without using central processing unit (CPU) resources.

(6) Soft decoding, that is, software decoding, is a manner of video decoding, and refers to decoding by using the CPU.

Before the video processing method in the embodiments of this disclosure is explained, the method in the related art is first described.

In the related art, when a specific effect video is produced, the video is generally produced by using code, or is produced by playing a special effect in a manner of a dynamic picture (for example, an animation special effect) or playing a video. Dynamic pictures are generally produced by using a Lottie animation, a GIF animation, an APNG animation, videos in a WebP format and an MP4 format, and the like. The methods such as the Lottie animation, the GIF animation, the APNG animation, videos in the WebP format and the MP4 format are described herein respectively.

Figure 2:
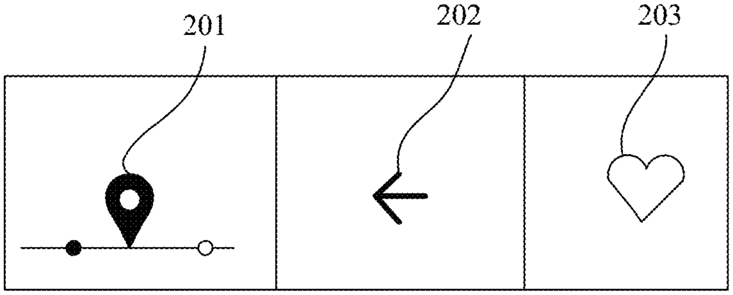
FIG. 2 is a schematic diagram of different button animation effects in Lottie animation design.

Lottie is a set of complete open-source cross-platform animation effect solutions. After designing an animation by using an effect production tool (such as Adobe After Effects, AE), a designer may export the designed animation into a JavaScript Object Notation (JSON) format by using a Bodymovin plug-in provided by the Lottie. Therefore, the animation can be directly applied to different systems without additional operations. FIG. 1 is an implementation process for producing a dynamic picture by using a Lottie animation. A designed animation is exported to a JSON file 103 in the JSON format through an AE 101 and a Bodymovin plugin 102. Therefore, the animation may be applicable to an iOS system, an Android system, a Web, and React Native (an open-source cross-platform mobile application development framework). In Lottie animation design, an animation effect such as a button is generally used. As shown in FIG. 2, a position arrow 201, a pointing arrow 202, a heart 203, and the like may all be implemented through the Lottie animation design.

A GIF animation is a screen in which a plurality of GIF pictures move quickly and successively according to a certain rule by using a special animation tool or by using a method of capturing an object frame by frame. For example, various dynamic memes may be produced by the GIF animation.

Figure 3:
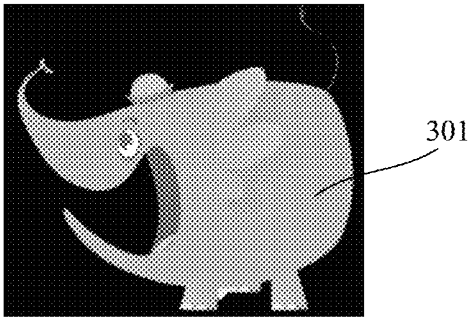
FIG. 3 is a schematic diagram of a special effect of an animation produced by using the APNG technology.

A PNG-based bitmap animation format (namely, animated portable network graphics, APNG) is an animation extension of the portable network graphics (PNG) format. The first frame of the APNG is a standard PNG image, and data such as the remaining animation other than the first frame and a frame rate is placed in a PNG extension data block. The APNG is similar to a key frame of a video. The key frame has complete image information, and only changing information is remained between two key frames. The APNG supports full color and transparency, and does not have a noise problem. FIG. 3 is a special animation effect produced by using an APNG technology. A boundary of an object 301 in the special animation effect is clear, and has no noise.

Figure 4:
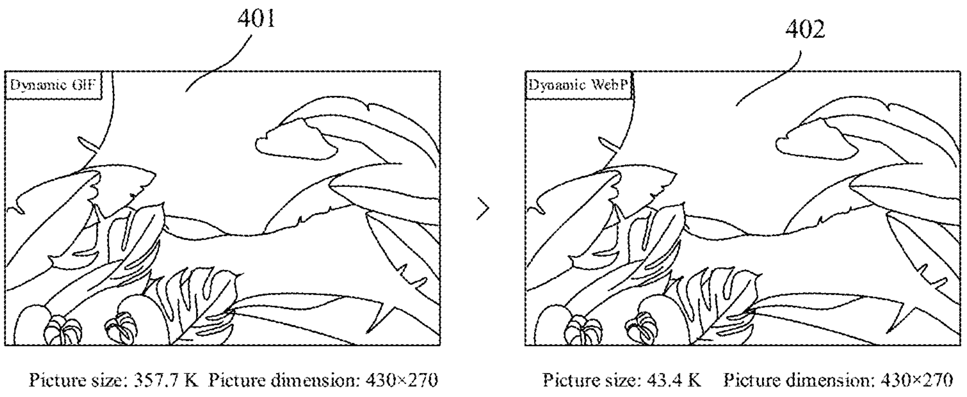
FIG. 4 is a schematic diagram of a comparison between sizes of a GIF dynamic picture and a WebP dynamic picture.

A main objective of WebP is to reduce a volume of a picture file when picture quality is the same as quality of a picture file in a Joint Photographic Experts Group (JPEG) format. Therefore, transmission time and traffic consumption of pictures on the Internet is reduced. FIG. 4 is a comparison between sizes of a GIF dynamic picture and a WebP dynamic picture. It can be seen that a picture size of a WebP dynamic picture 402 is smaller than a picture size of a GIF dynamic picture 401.

An MP4 video is a video formed by connecting animations frame-by-frame.

For production of the foregoing several types of dynamic pictures, a Lottie animation is a string file, supports soft decoding, and has no special particle effect. GIF animation also supports soft decoding, supports 8-bit colors, and supports an alpha transparent background. However, surrounding noise is very clear. APNG also supports soft decoding. Although an APNG animation is larger than an alpha video file, a problem that the GIF dynamic picture has noise is resolved. WebP also supports soft decoding, and the WebP dynamic picture is larger than the alpha video file. The MP4 video supports hard decoding, but does not support the alpha transparent background.

In the related art, in a code implementation, a programmer can completely produce a special effect video by writing code. However, when efficiency is considered, it is time-consuming and laborious to produce a complex special effect video (such as a particle special effect, a light and shadow special effect, or a water wave special effect) by using the code. However, when the special effect is played by playing the video, there is a problem that transparency is not supported, to be specific, the special effect video cannot be completely fused in a screen background. Consequently, it appears that a rectangle is attached to the screen background.

Based on the problems existing in the related art, the video processing method in the embodiments of this disclosure can resolve the problems, and also has advantages in decoding capability, ease of use, special effect restoration, transparency supporting, and the like.

In the video processing method in the embodiments of this disclosure, for each original video frame of an original special effect video, color channel information of each pixel point and transparency channel information of each pixel point in the original video frame are first obtained. A color picture corresponding to the original video frame is drawn based on the color channel information of each pixel point in the original video frame, and a transparency picture corresponding to the original video frame is drawn based on the transparency channel information of each pixel point in the original video frame. Then, splicing processing is performed on the color picture and the transparency picture of each original video frame based on preset configuration information, to obtain at least one spliced picture. In addition, video conversion processing is performed on the at least one spliced picture, to obtain a transparency spliced video. Finally, special effect video rendering is performed based on the preset configuration information and the transparency spliced video, to obtain a transparency special effect video, and the transparency special effect video is displayed. In this way, because the spliced picture includes both the color channel information of the original video frame and the transparency channel information of the original video frame, a generated transparency spliced video may carry the transparency information of the original special effect video, so that when special effect video rendering is performed, the transparency special effect video can be obtained through rendering based on the transparency information, and the effect of the special effect in the original special effect video can be highly restored when the transparency special effect video is played. Therefore, production costs of the transparency special effect video and memory usage during production are greatly reduced.

The following describes examples of a video processing device according to the embodiments of this disclosure. The video processing device is an electronic device configured to implement a video processing method. The video processing device (that is, an electronic device) provided in the embodiments of this disclosure may be implemented as a terminal, or may be implemented as a server. In an implementation, the video processing device provided in the embodiments of this disclosure may be implemented as any terminal having a video rendering and display function, a video processing function and a game function, such as a laptop computer, a tablet computer, a desktop computer, a mobile device (such as a mobile phone, a portable music player, a personal digital assistant, a dedicated messaging device, or a portable game device), an intelligent robot, a smart appliance, and a smart in-vehicle device. In another implementation, the video processing device provided in the embodiments of this disclosure may be implemented as the server, and the server may be an independent physical server, or a server cluster or a distributed system composed of a plurality of physical servers, or may alternatively be a cloud server that provides a cloud service, a cloud database, cloud computing, a cloud function, cloud storage, a network service, cloud communication, a middleware service, a domain name service, a security service, a content delivery network (CDN), and a basic cloud computing service such as big data and an artificial intelligence platform. The terminal and the server may be connected directly or indirectly in a wired or wireless communication protocol. This is not limited in the embodiments of this disclosure. The following describes an example when the video processing device is implemented as the server.

Figure 5:
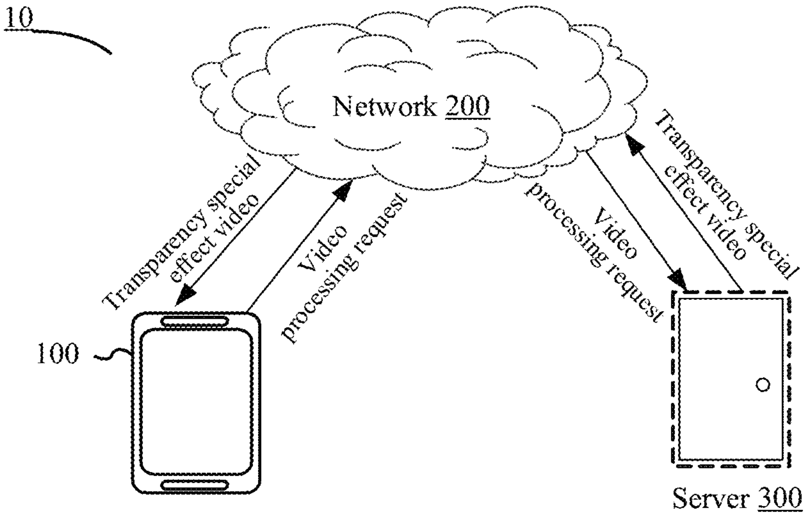
FIG. 5 is a schematic diagram of an example architecture of a video processing system according to an embodiment of this disclosure.

Referring to FIG. 5, FIG. 5 is a schematic diagram of an example architecture of a video processing system according to an embodiment of this disclosure. This embodiment of this disclosure is described by using an example in which a video processing method is applicable to special effect video production. In other words, a finally generated transparency special effect video may be any type of special effect video. In this embodiment of this disclosure, a video processing system 10 includes at least a terminal 100, a network 200, and a server 300. To support any special effect video production application, at least the special effect video production application is installed on the terminal 100 in this embodiment of this disclosure, or a video playing application is installed on the terminal 100. The video playing application has a special effect video production function module. Through the special effect video production function module, the video processing method provided in this embodiment of this disclosure can be used to generate a transparency special effect video. The server 300 is a server of the special effect video production application. The server 300 may constitute a video processing device in this embodiment of this disclosure. The terminal 100 is connected to the server 300 through the network 200. The network 200 may be a wide area network or a local area network, or a combination of the wide area network and the local area network.

When running the special effect video production application, the terminal 100 obtains an original special effect video through a client of the special effect video production application, encapsulates the original special effect video into a video processing request, and sends the video processing request to the server 300 through the network 200. The server 300 parses the video processing request, to obtain the original special effect video, obtains each original video frame of the original special effect video, and obtains color channel information and transparency channel information of each pixel point in the original video frame. Then, for each original video frame, a color picture corresponding to the original video frame is drawn based on the color channel information of each pixel point in the original video frame, and a transparency picture corresponding to the original video frame is drawn based on the transparency channel information of each pixel point in the original video frame. Then, splicing processing is performed on the color picture and the transparency picture of each original video frame based on preset configuration information, to obtain at least one spliced picture, and video conversion processing is performed on the at least one spliced picture, to obtain a transparency spliced video. Finally, special effect video rendering is performed based on the preset configuration information and the transparency spliced video, to obtain a transparency special effect video. After obtaining the transparency special effect video, the server 300 sends the transparency special effect video to the terminal 100, and displays the transparency special effect video at a specific position of a current interface of the terminal 100.

In some embodiments, the video processing method may alternatively be implemented by the terminal 100. In other words, the terminal serves as an execution entity, to obtain each original video frame of the original special effect video, and the color channel information and the transparency channel information of each pixel point of the original video frame. The terminal generates, for each original video frame, the color picture and the transparency picture corresponding to the original video frame based on the color channel information and the transparency channel information of each pixel point in the original video frame. The terminal performs splicing processing on the color picture and the transparency picture of each original video frame based on the preset configuration information, to obtain the at least one spliced picture; and performs video conversion processing on the at least one spliced picture, to obtain the transparency spliced video. Finally, the terminal performs special effect video rendering based on the preset configuration information and the transparency spliced video, to obtain the transparency special effect video. When obtaining the transparency special effect video, the terminal may further display the transparency special effect video on the current interface.

The video processing method provided in the embodiments of this disclosure may alternatively be implemented based on a cloud platform through a cloud technology. For example, the server 300 may be a cloud server. The cloud server obtains, for each original video frame of the original special effect video, the color channel information of each pixel point and the transparency channel information of each pixel point in the original video frame; or the cloud server generates the color picture and the transparency picture corresponding to the original video frame; or the cloud server performs splicing processing on the color picture and the transparency picture of each original video frame; or the cloud server performs video conversion processing on the at least one spliced picture; or the cloud server performs special effect video rendering based on the preset configuration information and the transparency spliced video, to obtain the transparency special effect video.

In some embodiments, there may further be a cloud storage device, and the original special effect video may be stored in the cloud storage device, or the color channel information and the transparency channel information of each pixel point in each original video frame may further be stored in the cloud storage device, or the color picture, the transparency picture, the spliced picture, the transparency spliced video, the transparency special effect video, and the like may further be stored in the cloud storage device. In this way, when the original special effect video is inputted, the spliced picture may be obtained from the cloud storage device, or the transparency spliced video is obtained from the cloud storage device, so that the transparency special effect video is quickly obtained through rendering.

The cloud technology is a hosting technology that unifies a series of resources such as hardware, software, and a network in a wide area network or a local area network, to implement data computing, storage, processing, and sharing. A general term for a network technology, an information technology, an integration technology, a management platform technology, and an application technology that are applied based on a cloud computing business model. The cloud technology can form resource pools and be used on demand. A cloud computing technology is becoming an important support. A background service of a technical network system needs a large quantity of computing and storage resources, such as a video website, an image website, and more portal websites. With the development and application of the internet industry, each item may have identification flag and needs to be transmitted to the background system for logic processing. Data of different levels is processed separately. Various industry data needs powerful system support, and this be implemented only through cloud computing.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

Figure 6:
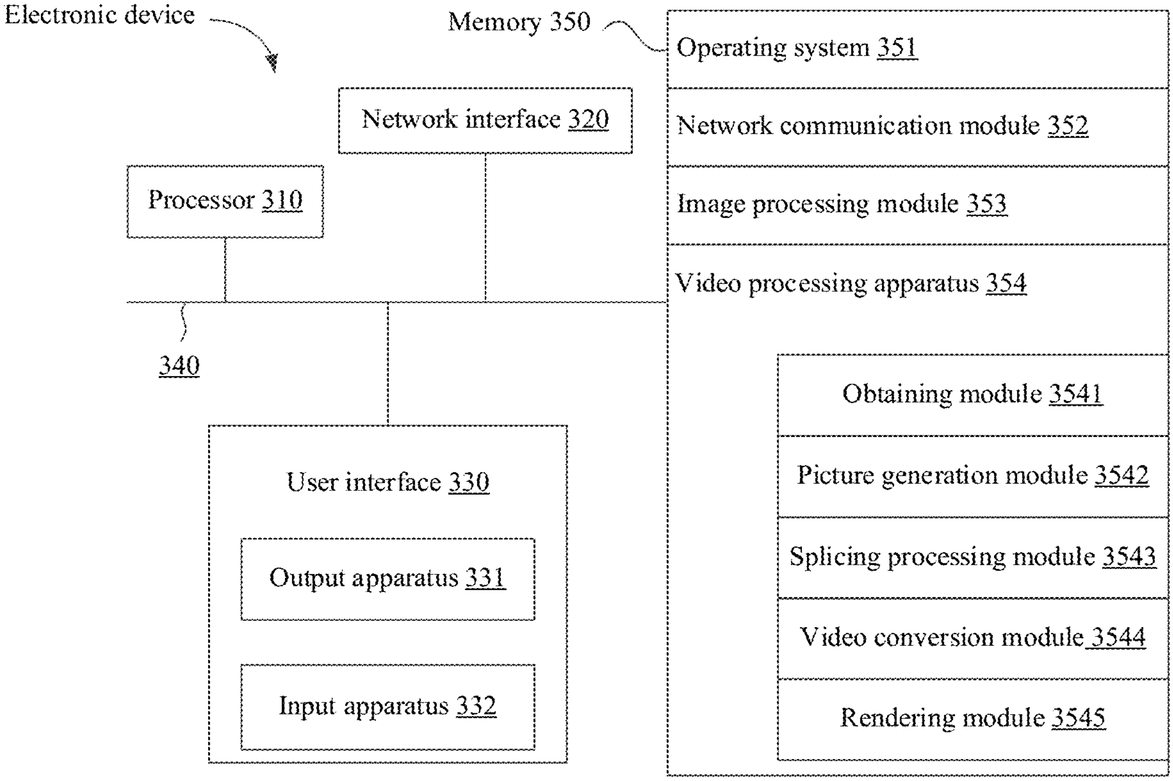
FIG. 6 is a schematic diagram of a structure of an electronic device according to an embodiment of this disclosure.

FIG. 6 is a schematic diagram of a structure of an electronic device according to an embodiment of this disclosure. An electronic device shown in FIG. 6 includes at least one processor 310, a memory 350, at least one network interface 320, and a user interface 330. All components in the electronic device are coupled together by using a bus system 340. The bus system 340 is configured to implement connection and communication between the components. In addition to a data bus, the bus system 340 further includes a power bus, a control bus, and a status signal bus. However, for ease of clear description, all types of buses are marked as the bus system 340 in FIG. 6.

Processing circuitry, such as the processor 310 may be an integrated circuit chip having a signal processing ability, for example, a general processor, a digital signal processor (DSP), or another programmable logic device, a discrete gate or a transistor logic device, or a discrete hardware component, where the general processor may be a microprocessor, any conventional processor, or the like.

The user interface 330 includes one or more output apparatuses 331 that can display media content, and one or more input apparatus 332.

The memory 350, such as a non-transitory computer-readable storage medium, may be a removable memory, a non-removable memory, or a combination of a removable memory and a non-removable memory. Example hardware devices include a solid state memory, a hard drive, an optical disk drive, and the like. In some embodiments, the memory 350 includes one or more storage devices physically remote from the processor 310. The memory 350 may be a volatile memory or a non-volatile memory, or may include both a volatile memory and a non-volatile memory. The non-volatile memory may be a read only memory (ROM), or the volatile memory may be a random access memory (RAM). The memory 350 described in the embodiments of this disclosure is intended to include, but is not limited to, memories of any suitable type. In some embodiments, the memory 350 can store data to support various operations. An example of the data includes a program, a module, a data structure, or a subset or a superset of the data. The following is an example for description.

An operating system 351 includes a system program configured to handle various basic system services and perform a hardware related task, for example, a framework layer, a core library layer, or a driver layer, used for implementing various basic services and processing a task based on hardware. A network communication module 352 is configured to reach another computing device through one or more (wired or wireless) network interfaces 320. Example network interfaces 320 include Bluetooth, Wi-Fi, a universal serial bus (USB), and the like. An input processing module 353 is configured to: detect input or interaction of the user from one or more input apparatuses 332, and translate the detected input or interaction.

In some embodiments, an apparatus provided in the embodiments of this disclosure may be implemented by using software. FIG. 6 shows a video processing apparatus 354 that is stored in the memory 350. The video processing apparatus 354 may be the video processing apparatus in the electronic device. The video processing apparatus 354 may be software in a form of a program, a plug-in, or the like, including the following software modules: an obtaining module 3541, a picture generating module 3542, a splicing processing module 3543, a video conversion module 3544, and a rendering module 3545. These modules are logical and can be combined or split in different manners depending on implemented functions. Functions of the modules are described below.

In some other embodiments, the apparatus provided in the embodiments of this disclosure may be implemented in hardware. For example, the apparatus provided in the embodiments of this disclosure may be implemented by using a hardware-coded processor, where the hardware-decoding processor is programed to perform the video processing method provided in the embodiments of this disclosure. For example, the hardware-decoding processor may use one or more application specific integrated circuits (ASICs), DSPs, programmable logic devices (PLDs), complex programmable logic devices (CPLDs), field-programmable gate arrays (FPGAs), or other electronic elements.

The video processing method provided in the embodiments of this disclosure may be performed by the electronic device. The electronic device may be any terminal having a video rendering and display function, a video processing function, and a game function, or may be the server. In other words, the video processing method in the embodiments of this disclosure may be performed by the terminal, or may be performed by the server, or may be performed by interaction between the terminal and the server.

Figure 7:
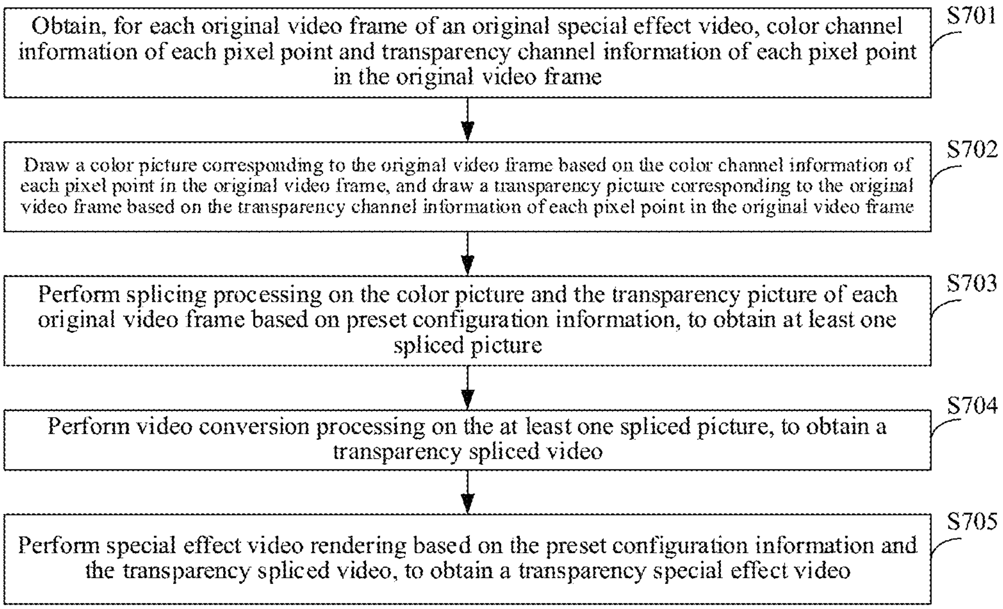
FIG. 7 is an example schematic flowchart of a video processing method according to an embodiment of this disclosure.

Referring to FIG. 7, FIG. 7 is an example schematic flowchart of a video processing method according to an embodiment of this disclosure. The following provides descriptions with reference to the operations shown in FIG. 7. The video processing method in FIG. 7 is described by using an example in which a server is used as an execution entity.

Operation S701: Obtain, for each original video frame of an original special effect video, color channel information of each pixel point and transparency channel information of each pixel point in the original video frame.

The original special effect video may be a special effect video produced through a special effect production tool. The special effect production tool may be Adobe After Effects (AE) software. The AE software may produce and output the original special effect video. The original special effect video may include any type of special effect content. For example, the special effect content includes a particle special effect, a light and shadow special effect, a water wave special effect, a game gift special effect, a flame special effect, or the like. In the original special effect video, the special effect content is content having transparency information. In other words, each pixel point in the original video frame includes the color channel information and the transparency channel information. If a terminal displays the original special effect video, a boundary of a display effect of the special effect content in the original special effect video is clear, and has no noise. For example, when the original video frame is an RGB image, the color channel information is stored in RGB channels of the original video frame, and the transparency channel information is stored in an alpha channel (that is, a transparency channel) of the original video frame.

The original special effect video is not a video that can be directly displayed, because a process of video decoding and rendering is to first obtain video YUV data through hard decoding or soft decoding on a video file in an MP4 format. Before video rendering is performed, the video YUV data needs to be converted into RGB format data, and the RGB format data is rendered, so that one frame of a video screen is displayed. Because a video data format before rendering is a YUV format, and the YUV format does not carry alpha information (namely, the transparency channel information), an MP4 video before rendering cannot carry the alpha information. In this case, the transparency information of the original special effect video is lost. Consequently, a rendered special effect video cannot be effectively fused with a background, and a display effect may be that the background is blocked by an area other than the special effect content in the original special effect video. For example, all original video frames in the original special effect video are rectangles. If the special effect content of the original video frame is a circle, after rendering in the foregoing rendering manner, because the transparency information is lost, the background is blocked by the entire rectangle, rather than only the circle is displayed. In the method of the embodiments of this disclosure, because the transparency information is extracted and effectively stored in subsequent operations, accurate rendering of the special effect video based on the transparency information can be ensured during rendering, so that an effect that the background image is blocked only by a circular special effect content, and other places of the background image are displayed normally is implemented.

In this embodiment of this disclosure, after the original special effect video is produced by using the special effect production tool, frame split processing may further be performed on the original special effect video, that is, video frame extraction is performed on the original special effect video, to obtain at least one original video frame, and output all original video frames. After each original video frame is obtained, the color channel information and the transparency channel information of each pixel point in the original video frame may be extracted. During extraction, RGBA channel values corresponding to each pixel point may be obtained, RGB channel values in the RGBA channel values are determined as the color channel information, and the alpha information in an A channel is determined as the transparency channel information.

In some embodiments, when the color channel information and the transparency channel information of each pixel point are extracted, position information of each pixel point in the original video frame may also be obtained, and the position information is stored in a mapping relationship with the color channel information and the transparency channel information of the pixel point. In this way, when a color picture and a transparency picture are generated subsequently, the color channel information and the transparency channel information may be assigned to each pixel point in the color picture and the transparency picture respectively based on the mapping relationship between the position information of each pixel point and the color channel information and the transparency channel information.

Operation S702: Draw the color picture corresponding to the original video frame based on the color channel information of each pixel point in the original video frame, and draw the transparency picture corresponding to the original video frame based on the transparency channel information of each pixel point in the original video frame.

In this embodiment of this disclosure, the color channel information and the transparency channel information of each pixel point may be assigned to the color picture and the transparency picture respectively. For example, two canvases having a same size as the original video frame may be provided respectively, and the color channel information and the transparency channel information are assigned to each pixel point in the canvas respectively, to obtain the color picture and the transparency picture.

The canvas (also referred to as a blank canvas) is a blank carrier that has the same size as the original video frame and does not render any image content. The blank carrier includes a plurality of pixel points. On the blank carrier, each pixel point does not include any pixel information, that is, no color channel information or transparency channel information is rendered on each pixel point. The pixel information of each pixel point on the blank carrier is rendered, to obtain any image having image content. In this embodiment of this disclosure, because a size of the canvas is the same as a size of the original video frame, corresponding to each pixel point in the original video frame, each of the color channel information and the transparency channel information may be assigned to each pixel point in one canvas of two canvases, so that each pixel point in the canvas carries the color channel information or the transparency channel information. Therefore, a color picture and a transparency picture having the image content are obtained. In some embodiments, the canvas may be a virtual canvas. In other words, after the color channel information and the transparency channel information of each pixel point are obtained, the color channel information and the transparency channel information may be assigned to each pixel point in the virtual canvas, to obtain the color picture and the transparency picture.

The color picture is a picture that carries the color channel information, and the transparency picture is a picture that carries the transparency channel information. Pixel parsing is performed on the color picture, to obtain a color pixel value of each pixel point in the original video frame. Pixel parsing is performed on the transparency picture, to obtain the transparency information of each pixel point in the original video frame. Therefore, all information about each pixel point in the original video frame can be obtained with reference to information in the color picture and the transparency picture.

In this embodiment of this disclosure, one color picture and one transparency picture may be generated for each original video frame in the original special effect video in sequence according to an order of original video frames in the original special effect video.

Operation S703: Perform splicing processing on the color picture and the transparency picture of each original video frame based on preset configuration information, to obtain at least one spliced picture.

The preset configuration information is information configured for representing a mapping relationship between each pixel point in the transparency picture and a pixel point in the color picture. When splicing processing is performed, positions of the color picture and the transparency picture in the canvas (that is, a spliced canvas) corresponding to the spliced picture can be determined respectively based on the preset configuration information.

The preset configuration information may include first position information of the transparency picture in the spliced canvas, a size parameter of the transparency picture, and an offset value of the transparency picture. The first position information of the transparency picture in the spliced canvas is a position of the spliced canvas corresponding to the spliced picture at which a center position of the transparency picture is located when splicing processing is performed. The size parameter of the transparency picture includes a width and a height of the transparency picture. A position of each pixel point in the transparency picture in the spliced canvas may be determined based on the width and the height of the transparency picture and the first position information of the transparency picture in the spliced canvas. In other words, positions at which a start pixel point and an end pixel point in the transparency picture are located respectively may be determined. The offset value of the transparency picture is a quantity of pixel points for which the transparency picture is offset from the color picture in at least one direction in the spliced picture. The at least one direction includes but is not limited to an extension direction along a length of the spliced canvas, an extension direction along a width of the spliced canvas, an extension direction along a diagonal of the spliced canvas, or the like.

The spliced canvas corresponding to the spliced picture is the blank canvas configured for adding the color picture and the transparency picture, to form the spliced picture. The spliced canvas corresponding to the spliced picture is the blank canvas having the same size as the spliced picture. In other words, when splicing processing is performed, a blank canvas may be first provided. Then, the color picture and the transparency picture are sequentially added to the blank canvas, or the color picture and the transparency picture are simultaneously added to the blank canvas, to form the spliced picture.

In some embodiments, a relative positional relationship between the color picture and the transparency picture in the spliced picture may not be fixed. In other words, the transparency picture may be located at any relative position of the color picture, and there is no overlapping area between the color picture and the transparency picture. For example, the transparency picture may be located at the upper side, the lower side, the left side, the right side, the upper right side, the lower right side, the upper left side, the lower left side, or the like of the color picture.

In some embodiments, a size of the color picture is the same as a size of the transparency picture, but in the spliced picture, a size of the color picture added to the spliced picture and a size of the transparency picture added to the spliced picture may be the same or different. In other words, zoom processing may be performed on at least one of the color picture and the transparency picture at a specific scale, and a zoomed color picture or a zoomed transparency picture is added to the spliced picture. In this embodiment of this disclosure, a zoom ratio for zoom processing may be determined based on information in the preset configuration information. In other words, when the preset configuration information is given, the zoom ratio of the color picture and the transparency picture is also determined, and zoom processing may be performed on the color picture and the transparency picture based on the given preset configuration information. In addition, because the preset configuration information is known, it may be subsequently directly determined, based on the preset configuration information, how large a scale of zoom processing is performed on the color picture and the transparency picture respectively when the splicing processing is performed.

In some other embodiments, zoom processing may only be performed on the transparency picture, and zoom processing is not performed on the color picture. In other words, the color picture is added to the blank canvas at a ratio of 1:1. The transparency picture is reduced to an appropriate scale, and then is added to the blank canvas. In this way, an amount of transparency information may be greatly reduced, and a plurality of pixel points in the color picture may correspond to one pixel point in the reduced transparency picture. In this embodiment of this disclosure, the transparency picture may be reduced to 0.5 times.

The preset configuration information of the color picture and the transparency picture of each original video frame when splicing processing is performed is the same. In other words, all original video frames in a same original special effect video share same preset configuration information. In this way, in each obtained spliced picture, the size of the color picture and the size of the transparency picture are the same, and a position of the color picture and a position of the transparency picture are the same.

Operation S704: Perform video conversion processing on the at least one spliced picture, to obtain a transparency spliced video.

The video conversion processing is to perform video compression processing on the obtained at least one spliced picture in a time sequence, to obtain the transparency spliced video.

Operation S705: Perform special effect video rendering based on the preset configuration information and the transparency spliced video, to obtain a transparency special effect video.

The channel information of the pixel point may be obtained from each video frame (namely, the spliced picture) of the transparency spliced video based on the preset configuration information. In other words, the color channel information may be obtained from the color picture in the spliced picture, and the transparency channel information is obtained from the transparency picture in the spliced picture.

To ensure accurate special effect video rendering, a series of processing such as video format conversion is performed before special effect video rendering is performed. Because each spliced picture in the transparency spliced video retains both the color channel information and the transparency channel information, the transparency channel information of the original video frame is not lost even through the processing such as video format conversion. Therefore, when special effect video rendering is performed, the transparency channel information of the original video frame may be considered, so that a boundary of the special effect content in a transparency special effect video obtained through rendering is clear, and content of an area other than the special effect content in the background image behind the transparency special effect video is not blocked. In addition, because an entire process does not need to be implemented by writing code, a processing process of the transparency special effect video is greatly simplified. In addition, a produced transparency special effect video does not occupy excessive memory overheads.

It can be learned that, in the video processing method provided in the embodiments of this disclosure, for each original video frame in the original special effect video, the color picture and the transparency picture corresponding to the original video frame are correspondingly generated based on the color channel information and the transparency channel information of each pixel point in the original video frame respectively, and splicing processing is performed on the color picture and the transparency picture, to obtain the at least one spliced picture, and then video conversion processing is performed on the at least one spliced picture, to obtain the transparency spliced video, so that special effect video rendering is performed based on the preset configuration information and the transparency spliced video, to obtain the transparency special effect video. In this way, because the spliced picture includes both the color channel information of the original video frame and the transparency channel information of the original video frame, a generated transparency spliced video also carries the transparency information of the original special effect video, so that when special effect video rendering is performed, the transparency special effect video can be obtained through rendering based on the transparency information, and the effect of the special effect in the original special effect video can be highly restored when the transparency special effect video is played. Therefore, production costs of the transparency special effect video and memory usage during production are greatly reduced.

In some embodiments, a video processing system includes at least a terminal and a server. A special effect video production application is installed on the terminal, or a video playing application is installed on the terminal. The video playing application has a special effect video production function module. Through the special effect video production function module, the video processing method provided in this embodiment of this disclosure can be used to generate a transparency special effect video.

Figure 8:
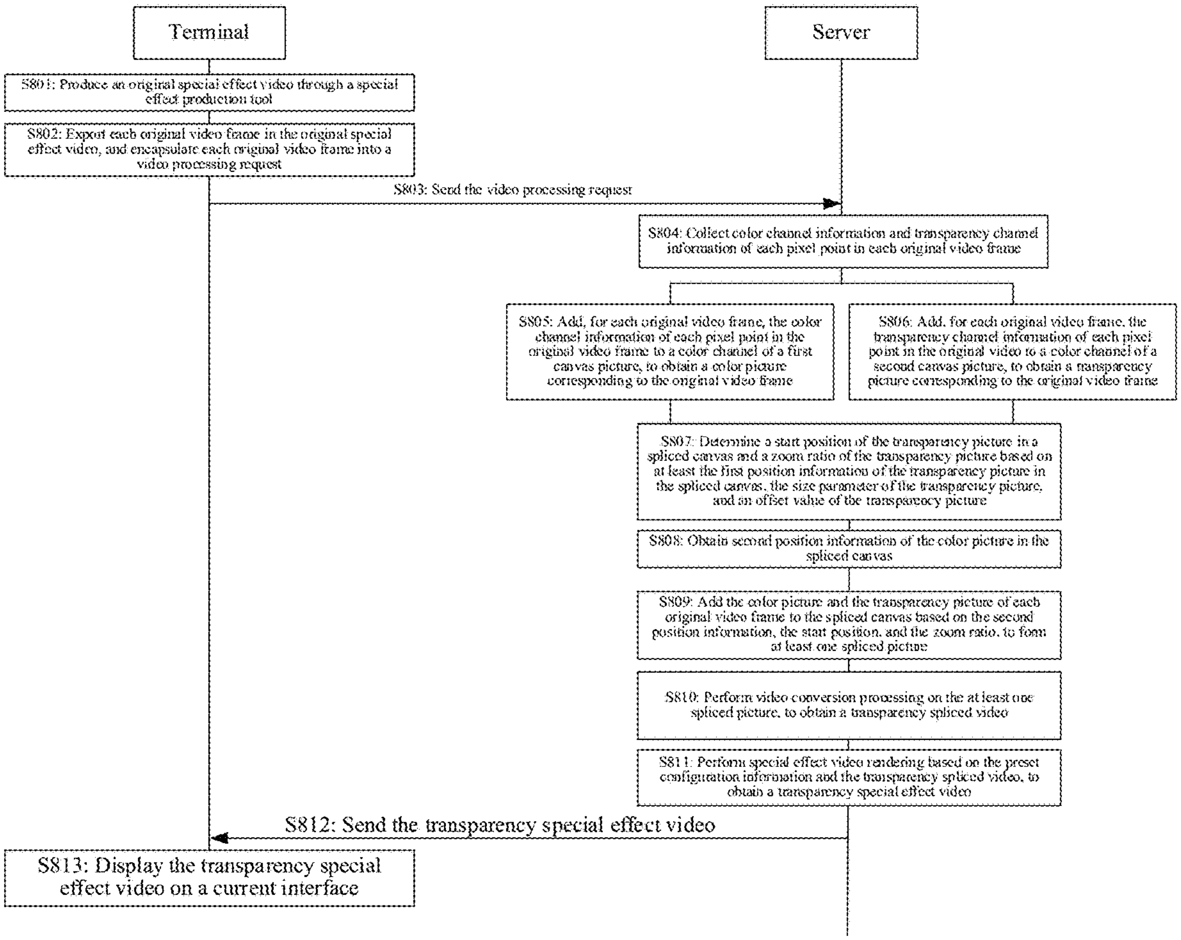
FIG. 8 is another example schematic flowchart of a video processing method according to an embodiment of this disclosure.

FIG. 8 is another example schematic flowchart of a video processing method according to an embodiment of this disclosure. As shown in FIG. 8, the method includes the following operations.

Operation S801: A terminal produces an original special effect video through a special effect production tool.

In this embodiment of this disclosure, a user may produce the original special effect video through the special effect production tool in a special effect video production function module. When the original special effect video is produced, the terminal may receive a special effect production operation inputted by the user through the special effect video production function module of a video playing application. When inputting the special effect production operation, the user may input a special effect parameter such as a type of the special effect, content of the special effect, a size of the special effect, delay duration of the special effect, a color of the special effect, and distribution of the special effect. The special effect production tool produces the original special effect video based on an inputted special effect parameter.

Operation S802: The terminal exports each original video frame in the original special effect video through the special effect production tool, and encapsulates each original video frame into a video processing request.

After the original special effect video is produced through the special effect production tool, frame split processing or video frame recognition may be performed on the original special effect video, to obtain each original video frame in the original special effect video. Each original video frame is outputted, and each original video frame is stored in a specific storage location of the video playing application.

After each original video frame is obtained through the special effect production tool, each original video frame may further be encapsulated into the video processing request. The video processing request is configured for requesting to process each original video frame in the original special effect video, to obtain a transparency special effect video from which an effect of special effect can be rendered.

Operation S803: The terminal sends the video processing request to a server.

Operation S804: The server collects color channel information and transparency channel information of each pixel point in each original video frame.

The server parses a pixel value of each pixel point in each original video frame, to extract the color channel information and the transparency channel information of each pixel point in the original video frame.

For example, the original video frame exported through the special effect production tool may be a PNG format picture. During information extraction, RGBA channel values corresponding to each pixel point in the PNG format picture may be obtained, RGB channel values in the RGBA channel values are determined as the color channel information, the color channel information includes an R-channel value, a G-channel value, and a B-channel value, and alpha information in an A channel is determined as the transparency channel information.

Operation S805: The server adds, for each original video frame, the color channel information of each pixel point in the original video frame to a color channel of a first canvas picture, to obtain a color picture corresponding to the original video frame.

The first canvas picture is a blank canvas to which pixel value information of any pixel point is not added, that is, the first canvas picture does not include information of any pixel point. A size of the first canvas picture is the same as a size of the original video frame.

When the color channel information of each pixel point in the original video frame is added to the color channel of the first canvas picture, the color channel information of each pixel point may be sequentially added to the color channel at a corresponding position of the first canvas picture based on a position of the pixel point in the original video frame, to obtain the color picture including the color channel information of the original video frame. A size of the color picture is the same as the size of the original video frame.

In some embodiments, the color channel information may include the RGB channel values. The RGB channel values of each pixel point in the original video frame may be correspondingly added to the RGB channels of the first canvas picture respectively, to obtain the color picture corresponding to the original video frame.

Operation S806: The server adds, for each original video frame, the transparency channel information of each pixel point in the original video frame to a color channel of a second canvas picture, to obtain a transparency picture corresponding to the original video frame.

The second canvas picture is also the blank canvas to which the pixel value information of any pixel point is not added, that is, the second canvas picture does not include the information of any pixel point. A size of the second canvas picture is the same as the size of the original video frame.

When the transparency channel information of each pixel point in the original video frame is added to the color channel of the second canvas picture, the transparency channel information of each pixel point may be sequentially added to the color channel at a corresponding position of the second canvas picture based on a position of the pixel point in the original video frame, to obtain the transparency picture including the transparency channel information of the original video frame. A size of the transparency picture is also the same as the size of the original video frame.

In some embodiments, the transparency channel information may include the transparency value. The transparency value of each pixel point in the original video frame may be added to the RGB channels of the second canvas picture respectively, to obtain the color picture corresponding to the original video frame. The transparency value may be a value of 0 to 255, where 0 indicates full transparency, and 255 indicates opacity. A higher transparency value indicates greater opacity.

Operation S807: The server determines a start position of the transparency picture in a spliced canvas and a zoom ratio of the transparency picture based on at least the first position information of the transparency picture in the spliced canvas, the size parameter of the transparency picture, and an offset value of the transparency picture.

The foregoing preset configuration information includes the first position information of the transparency picture in the spliced canvas, the size parameter of the transparency picture, and the offset value of the transparency picture. The first position information of the transparency picture in the spliced canvas is configured for representing a position of the spliced canvas corresponding to the spliced picture at which a center position of the transparency picture is located when splicing processing is performed. The size parameter of the transparency picture includes a width and a height of the transparency picture. A position of each pixel point in the transparency picture in the spliced canvas may be determined based on the width and the height of the transparency picture and the first position information of the transparency picture in the spliced canvas. In other words, positions at which a start pixel point and an end pixel point in the transparency picture are located respectively may be determined. The offset value of the transparency picture is a quantity of pixel points for which the transparency picture is offset from the color picture in at least one direction in the spliced picture. The at least one direction includes but is not limited to an extension direction along a length of the spliced canvas, an extension direction along a width of the spliced canvas, an extension direction along a diagonal of the spliced canvas, or the like.

In some embodiments, the start position of the transparency picture in the spliced canvas may be determined based on the first position information of the transparency picture in the spliced canvas and the size parameter of the transparency picture.

In an implementation, because the first position information can represent a position of the center position of the transparency picture in the spliced canvas corresponding to the spliced picture, the size parameter of the transparency picture includes the width and the height of the transparency picture. Therefore, positions at which the start pixel point (that is, the first pixel point) and the end pixel point (that is, the last pixel point) in the transparency picture are respectively located may be determined based on the width and the height of the transparency picture and the position of the center position of the transparency picture in the spliced canvas corresponding to the spliced picture. In other words, at least the start position (that is, a position at which the start pixel point is located) and an end position of the transparency picture in the spliced canvas may be determined. Because the size parameter of the transparency picture is known, generally, the end position may not be considered. In other words, only the start position of the transparency picture in the spliced canvas needs to be determined.

In another implementation, because the first position information can represent the position of the center position of the transparency picture in the spliced canvas corresponding to the spliced picture, the size parameter of the transparency picture includes the width and the height of the transparency picture. Therefore, a position at which each pixel point on a boundary line (that is, a frame of the picture) of the transparency picture is located may be determined based on the width and the height of the transparency picture and the position of the center position of the transparency picture in the spliced canvas corresponding to the spliced picture. In this way, a position at which a pixel point on any boundary line in a bounding box is located may be determined as the start position of the transparency picture in the spliced canvas. Therefore, with the boundary line as a starting point, the position of each pixel point in the transparency picture in the spliced canvas may be determined.

In some embodiments, the zoom ratio of the transparency picture may be further determined based on the size parameter of the transparency picture and the offset value of the transparency picture.

The offset value of the transparency picture is a quantity of pixel points for which the transparency picture is offset from the color picture in at least one direction in the spliced picture. In other words, the quantity of pixel points in which the pixel point of the transparency picture corresponds to any one of the pixel point of the color picture and the transparency picture is offset in two directions may be determined in the transparency picture based on the offset value of the transparency picture.

For example, the transparency picture may be reduced to 0.5 times. Before zoom processing is performed, the size of the transparency picture and the size of the color picture are in a 1:1 ratio. Therefore, a pixel point at a (0, 0) position in the color picture corresponds to a pixel point at a (0, 0) position in the transparency picture. However, because the transparency picture is reduced to 0.5 times, the position of the pixel point in the transparency picture is shifted. Therefore, a pixel point at a (2, 2) position in the color picture corresponds to a pixel point at a (1, 1) position in the transparency picture, and a pixel point at a (4, 4) position in the color picture corresponds to a pixel point at a (2, 2) position in the transparency picture. It can be learned that, the quantity of pixel points in which the transparency picture is offset from the color picture in a length direction and a width direction of the transparency picture is 2.

Operation S808: The server obtains second position information of the color picture in the spliced canvas.

The second position information is a position of the spliced canvas corresponding to the spliced picture at which a center position of the color picture is located when splicing processing is performed.

Operation S809: The server adds the color picture and the transparency picture of each original video frame to the spliced canvas based on the second position information, the start position, and the zoom ratio, to form at least one spliced picture.

In some embodiments, operation S809 may be implemented in the following manners. The color picture may be first added, for each original video frame, to a position corresponding to the second position information in the spliced canvas, to obtain the spliced canvas having the color picture. In other words, a position at which the center position of the color picture is located in the spliced canvas is a starting point of expansion. Pixel point expansion is performed on the color picture from the center position, so that each pixel point in the color picture is added to the spliced canvas, to form the spliced canvas having the color picture. In addition, zoom processing may further be performed on the transparency picture based on the zoom ratio, to obtain a zoomed transparency picture. For example, the transparency picture may be reduced to a half size based on a zoom ratio of 0.5. Finally, the zoomed transparency picture is added to the spliced canvas having the color picture by using the start position as a start adding position of the zoomed transparency picture, to obtain the spliced picture. In other words, each pixel point of the zoomed transparency picture is added to the spliced canvas having the color picture based on position information of the start position.

In some other embodiments, operation S809 may alternatively be implemented in the following manners. First, the transparency picture is added to the spliced canvas. In other words, zoom processing is first performed on the transparency picture based on the zoom ratio, to obtain the zoomed transparency picture, and the zoomed transparency picture is added to the spliced canvas based on the start position as the start adding position of the zoomed transparency picture. Then, the color picture is added to a position corresponding to the second position information in the spliced canvas having the zoomed transparency picture, to obtain the spliced picture.

Operation S810: The server performs video conversion processing on the at least one spliced picture, to obtain a transparency spliced video.

The video conversion processing is to perform video compression processing on the obtained at least one spliced picture in a time sequence, to obtain the transparency spliced video.

Operation S811: The server performs special effect video rendering based on the preset configuration information and the transparency spliced video, to obtain a transparency special effect video.

Operation S812: The server sends the transparency special effect video to the terminal.

Operation S813: The terminal displays the transparency special effect video on a current interface.

According to the video processing method provided in the embodiments of this disclosure, the start position of the transparency picture in the spliced canvas and the zoom ratio of the transparency picture are determined based on the first position information of the transparency picture in the spliced canvas, the size parameter of the transparency picture, and the offset value of the transparency picture, so that the color picture and the transparency picture of each original video frame can be added to the spliced canvas based on the second position information, the start position, and the zoom ratio of the color picture in the spliced canvas, to implement accurate splicing processing of the color picture and the transparency picture, to form the at least one spliced picture. In addition, the spliced picture is also a picture that carries the color channel information and the transparency channel information of each pixel point in the original video frame. Therefore, video conversion processing and special effect video rendering are further performed on the spliced picture, to obtain the transparency special effect video carrying the transparency channel information. Therefore, the effect of the special effect in the original special effect video is highly restored when the transparency special effect video is played.

In some embodiments, the transparency spliced video corresponds to a video compression encoding format. The video compression encoding format includes, but is not limited to, an MP4 video format. The video processing method in the embodiments of this disclosure may further include the following manners. First, the server obtains the first position information of the transparency picture in the spliced canvas, the size parameter of the transparency picture, and the offset value of the transparency picture. Then, the server performs data format conversion on the first position information of the transparency picture in the spliced canvas, the size parameter of the transparency picture, and the offset value of the transparency picture based on a preset data storage format, to obtain a configuration information string. Finally, the server inserts the configuration information string into a preset position of a data header in the video compression encoding format.

In some embodiments, the data format conversion may be that the first position information of the transparency picture in the spliced canvas, the size parameter of the transparency picture, and the offset value of the transparency picture are converted into a JSON string, to obtain information of a JSON string format. The information of the JSON string format is the configuration information string. In this embodiment of this disclosure, the information of the JSON string format may be inserted into a preset position of a data header in the MP4 video format. For example, the data header may be inserted into a second box position of the data header.

In some other embodiments, the foregoing video processing method may also be implemented by the terminal. In other words, the terminal is used as an execution entity. After the original special effect video is obtained, video frame extraction is performed on the original special effect video, to obtain at least one original video frame. In addition, information extraction is performed on each original video frame, to obtain the color channel information and the transparency channel information of each pixel point in each original video frame. Then, for each original video frame, the color picture and the transparency picture corresponding to the original video frame are generated based on the color channel information and the transparency channel information of each pixel point in the original video frame respectively. Splicing processing is performed on the color picture and the transparency picture of each original video frame based on the preset configuration information, to obtain the at least one spliced picture. Video conversion processing is performed on the at least one spliced picture, to obtain the transparency spliced video. Finally, special effect video rendering is performed based on the preset configuration information and the transparency spliced video, to obtain the transparency special effect video. When the transparency special effect video is obtained, the transparency special effect video is displayed on the current interface. In addition, the terminal obtains the preset configuration information such as the first position information of the transparency picture in the spliced canvas, the size parameter of the transparency picture, and the offset value of the transparency picture; performs data format conversion on the first position information of the transparency picture in the spliced canvas, the size parameter of the transparency picture, and the offset value of the transparency picture based on the preset data storage format, to obtain the configuration information string; and inserts the configuration information string into the preset position of the data header in the video compression encoding format.

In the foregoing manner, the configuration information string is inserted into the preset position of the data header in the video compression encoding format. In other words, the preset configuration information is pre-stored into the preset position of the data header in the video compression encoding format. Therefore, the preset configuration information can be directly obtained from the preset position of the data header in the video compression encoding format. In this embodiment of this disclosure, before the splicing processing is performed on the color picture and the transparency picture of each original video frame based on the preset configuration information, the following operations may be further implemented: obtaining the configuration information string from the preset position of the data header; and performing string parsing on the configuration information string, to obtain the preset configuration information.

Figure 9:
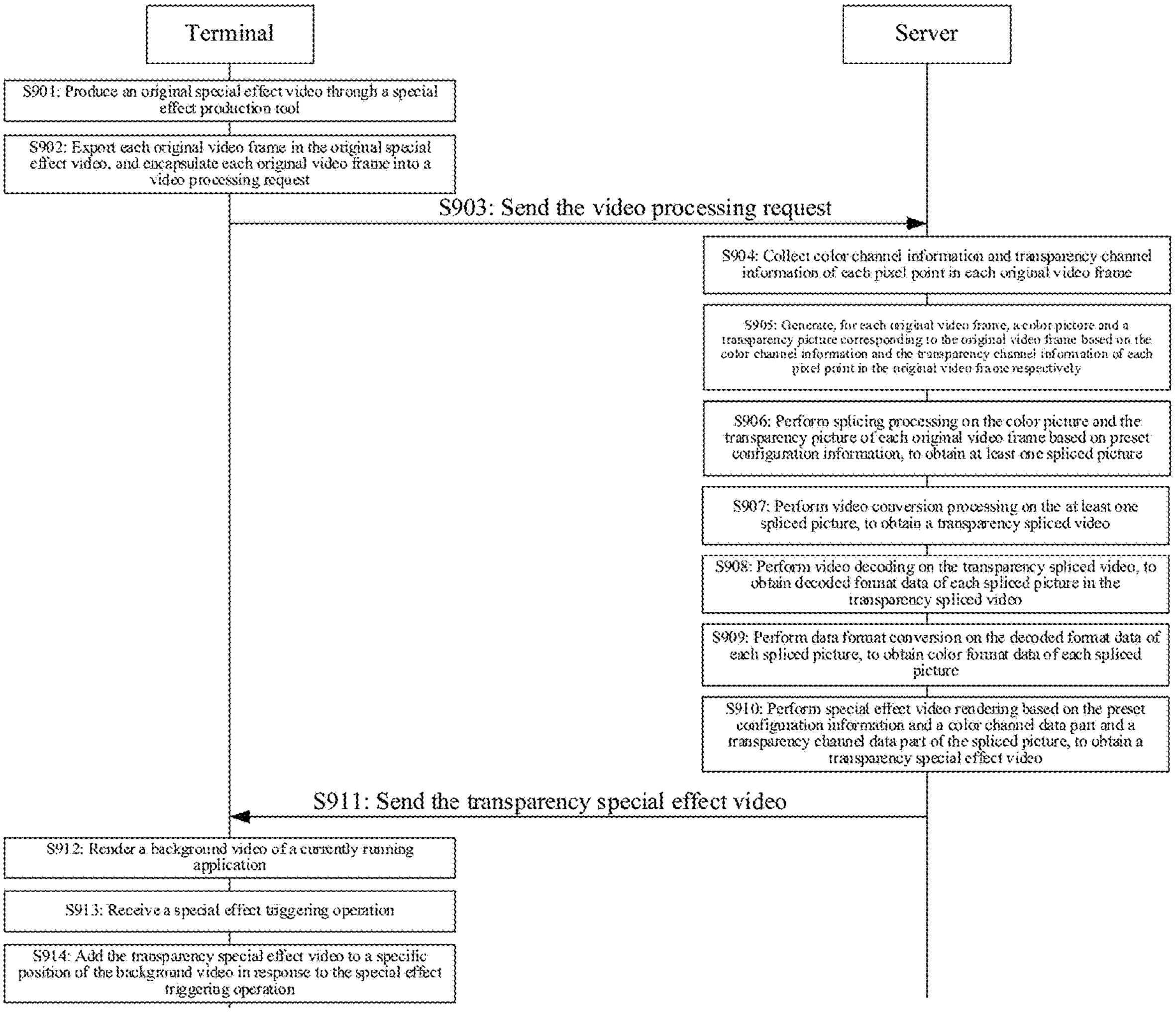
FIG. 9 is still another example schematic flowchart of a video processing method according to an embodiment of this disclosure.

FIG. 9 is still another example schematic flowchart of a video processing method according to an embodiment of this disclosure. As shown in FIG. 9, the method includes the following operations.

Operation S901: A terminal produces an original special effect video through a special effect production tool.

Operation S902: The terminal exports each original video frame in the original special effect video through the special effect production tool, and encapsulates each original video frame into a video processing request.

Operation S903: The terminal sends the video processing request to a server.

Operation S904: The server collects color channel information and transparency channel information of each pixel point in each original video frame.

Operation S901 to Operation S904 are the same as Operation S801 to Operation S804 described above. Details are not described in this embodiment of this disclosure.

Operation S905: The server generates, for each original video frame, a color picture and a transparency picture corresponding to the original video frame based on the color channel information and the transparency channel information of each pixel point in the original video frame respectively.

In this embodiment of this disclosure, the color channel information and the transparency channel information of each pixel point may be assigned to the color picture and the transparency picture respectively. For example, two canvases having a same size as the original video frame may be provided respectively, and the color channel information and the transparency channel information are assigned to each pixel point in the canvas respectively, to obtain the color picture and the transparency picture. The color picture is a picture that carries the color channel information, and the transparency picture is a picture that carries the transparency channel information.

Operation S906: The server performs splicing processing on the color picture and the transparency picture of each original video frame based on preset configuration information, to obtain at least one spliced picture.

The preset configuration information is information configured for representing a mapping relationship between each pixel point in the transparency picture and the pixel point in the color picture. When splicing processing is performed, positions of the color picture and the transparency picture in a spliced canvas corresponding to the spliced picture can be determined respectively based on the preset configuration information.

Operation S907: The server performs video conversion processing on the at least one spliced picture, to obtain a transparency spliced video.

Operation S908: The server performs video decoding on the transparency spliced video, to obtain decoded format data of each spliced picture in the transparency spliced video.

The decoded format data of the transparency spliced video may be obtained through hardware decoding or software decoding (for example, by using video player hardware decoding or software decoding). The decoded format data may be video frame YUV data.

Operation S909: The server performs data format conversion on the decoded format data of each spliced picture, to obtain color format data of each spliced picture, the color format data including a color channel data part and a transparency channel data part.

The video frame YUV data corresponding to each spliced picture may be converted into the color format data in an RGB data format through a conversion formula. Because the spliced picture is formed by splicing the color picture and the transparency picture, the color picture carries the color channel information, and the transparency picture carries the transparency channel information, the color format data in the RGB data format after video decoding and data format conversion includes the color channel data part and the transparency channel data part. The color channel data part corresponds to the color channel information carried in the color picture, and the transparency channel data part corresponds to the transparency channel information carried in the transparency picture.

Operation S910: The server performs special effect video rendering based on the preset configuration information and the color channel data part and the transparency channel data part of the spliced picture, to obtain a transparency special effect video.

In some embodiments, operation S910 may be implemented in the following manners. First, information of a JSON string format is obtained from a preset position of a data header in an MP4 video format, that is, the preset configuration information stored at the preset position of the data header in the MP4 video format is obtained. Then, a mapping relationship between each piece of color channel sub-data in the color channel data part and each transparency channel sub-data in the transparency channel data part is determined based on the preset configuration information. The color channel sub-data is data corresponding to each pixel point in the color channel data part. The transparency channel sub-data is data corresponding to each pixel point in the transparency channel data part. Then, the color channel sub-data and the transparency channel sub-data that have the mapping relationship are determined as channel data of a same pixel point. In other words, the color channel sub-data and the transparency channel sub-data representing the same pixel point information that have the mapping relationship are associated, to jointly represent the channel data of the same pixel point. In addition, position information of the color channel sub-data in the channel data of each pixel point in the color picture is determined as the position information of the pixel point. Because when splicing processing is performed on the color picture and the transparency picture, zoom processing is performed on the transparency picture, and zoom processing is not performed on the color picture. Therefore, each pixel point in the color picture may be in a one-to-one correspondence with the original video frame, so that the position information of each pixel point in the color picture corresponds to the position information of the pixel point in the original video frame. In this way, in the obtained color channel sub-data, the position information of the color channel sub-data in the color picture also corresponds to the position information of the pixel point in the original video frame. Therefore, the position information of the color channel sub-data in the color picture may be determined as the position information of the pixel point. Finally, special effect video rendering is performed on the channel data of each pixel point based on the position information of each pixel point, to obtain the transparency special effect video.

In this embodiment of this disclosure, when special effect video rendering is performed on the channel data of each pixel point, based on the position information of each pixel point, the color channel sub-data in the channel data of the pixel point is used as the RGB data, and the transparency channel sub-data in the channel data of the pixel point is used as alpha information, to implement special effect video rendering, and obtain the transparency special effect video.

Operation S911: The server sends the transparency special effect video to the terminal.

Operation S912: The terminal renders a background video of a currently running application.

The background video may be any type of video, for example, a short video, a TV series, or a game video. Certainly, the background video may also be a picture, that is, a picture displayed on a current interface by the terminal.

Operation S913: The terminal receives a special effect triggering operation.

Operation S914: The terminal adds the transparency special effect video to a specific position of the background video in response to the special effect triggering operation.

That the transparency special effect video is added to a specific position of the background video may be that the transparency special effect video is displayed on the background video. In some embodiments, a user may specify the specific position, and the terminal may also perform video analysis on the background video, to intelligently determine a specific position configured for superimposing the transparency special effect video.

The method of the embodiments of this disclosure may be applicable to at least the following scenarios.

Scenario 1: A special effect video production application is installed on the terminal, and the special effect video production application is configured to produce and generate the transparency special effect video. A special effect video production request may be inputted on a client of the special effect video production application. A server of the special effect video production application may use the video processing method in the embodiments of this application to generate a transparency spliced video carrying the transparency channel information in response to the special effect video production request, and further generate the transparency special effect video. After the transparency special effect video is generated, the transparency special effect video may be sent to the client of the terminal as a response result of the special effect video production request, and the transparency special effect video is displayed on the client. The transparency special effect video may also be outputted, as a product produced by the special effect video production application, to another video application. The another video application is enabled to directly apply the transparency special effect video generated by the special effect video production application.

Scenario 2: The special effect video production application is installed on the terminal, or a video playing application is installed on the terminal. The video playing application has a special effect video production function module. Through the special effect video production function module, the video processing method provided in this embodiment of this disclosure can be used to generate a transparency special effect video. When the user plays the video on the client of the video playing application, to spice up the video playing, if the user expects to display the special effect video on top of a current playing video, the special effect video production function module may be operated, to trigger a video processing procedure in the embodiments of this disclosure, to generate the transparency special effect video, and when the transparency special effect video is generated, the transparency special effect video is superimposed on the current playing video, and the transparency special effect video and the current playing video are displayed simultaneously.

Scenario 3: A game application is installed on the terminal. In a process of game application running, if expecting to add the special effect to the game application, the player may perform an operation on the game client, and select a special effect button. In this case, the video processing method in the embodiments of this disclosure may be used to generate the transparency special effect video. The transparency special effect video is superimposed into a game picture on a game interface, and the transparency special effect video and the game picture are played simultaneously.

In some embodiments, when the user enters the special effect triggering operation through the client, a playing position of the transparency special effect video may alternatively be inputted. After generating the transparency special effect video, the server feeds back the transparency special effect video to the terminal, and the client of the terminal inserts the transparency special effect video at the playing position or plays the transparency special effect video at the playing position.

In some embodiments, when the user enters the special effect triggering operation through the client, a display quantity of special effect content may alternatively be inputted. In this way, when generating the transparency special effect video, the server may generate the transparency special effect video having a corresponding quantity of special effect content based on the display quantity of the special effect content, and play the transparency special effect video. Alternatively, in some other embodiments, the server may generate a transparency special effect video including one piece of special effect content, after generating the transparency special effect video, duplicate the transparency special effect video, to obtain the transparency special effect videos that a quantity of transparency special effect videos are the same as the displayed quantity of special effect content, and play the quantity of transparency special effect videos simultaneously. The special effect content is an object in the transparency special effect video. For example, for a game special effect, the special effect content may be an object such as a pair of shoes, a bouquet of flowers, or a book in the displayed special effect.

In some embodiments, when the user enters the special effect triggering operation for a plurality of types of special effect content through the client, the server may simultaneously generate a transparency special effect video having the plurality of types of special effect content in response to the special effect triggering operation of the user, feed back a plurality of generated transparency special effect videos to the client, and play the plurality of transparency special effect videos sequentially or simultaneously on the client. If playing positions of the plurality of transparency special effect videos are the same, the plurality of transparency special effect videos may be played sequentially. If playing positions of the plurality of transparency special effect videos are different, the plurality of transparency special effect videos may be played simultaneously.

The following describes an example in a scenario in the embodiments of this disclosure.

In a game special effect usage scenario, special effects implemented through programming make the game cooler and more interesting, but for object dispersion that occurs in a particle special effect, a light and shadow special effect, and a water wave special effect, it is not the best way to implement such special effects through programming. According to the video processing method provided in the embodiments of this disclosure, implementation of the particle special effect, the light and shadow special effect, the water wave special effect, and the like can be as simple as playing a video. In this way, development time of the game special effect is greatly reduced, and performance improvement is ensured. Therefore, the video processing method is better than solutions in the related art in video processing efficiency, performance, and user experience.

Figure 10:
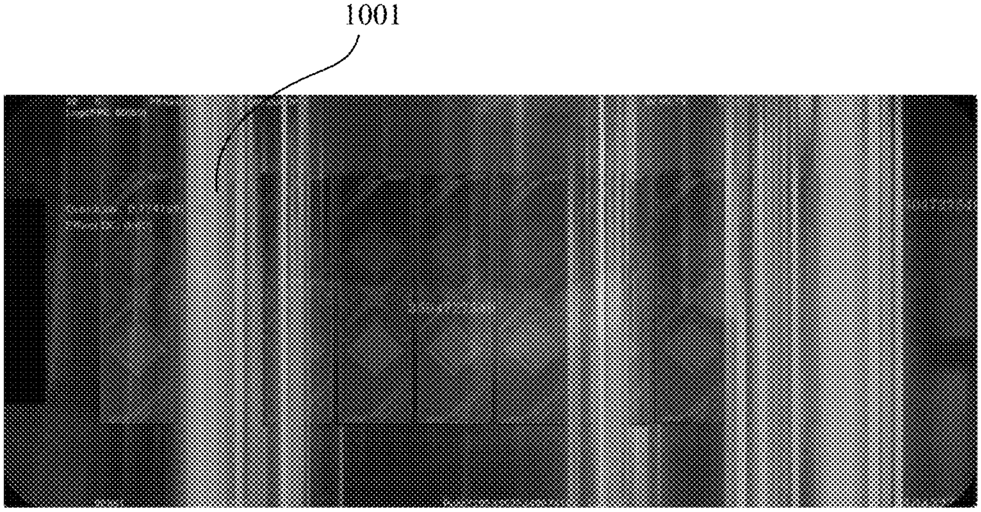
FIG. 10 is a schematic diagram of a light and shadow special effect according to an embodiment of this disclosure.
Figure 11:
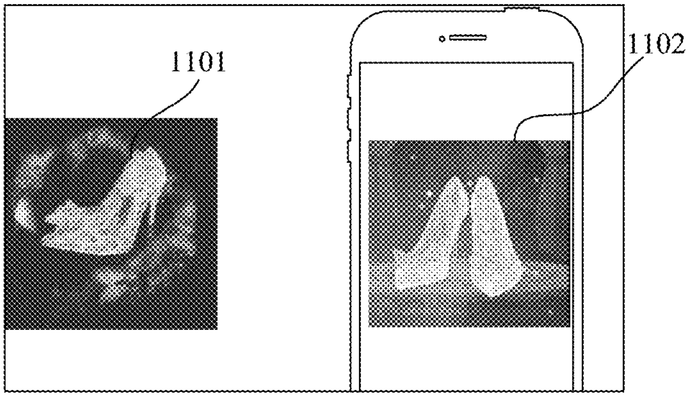
FIG. 11 is a schematic diagram of a game gift special effect according to an embodiment of this disclosure.
Figure 12:
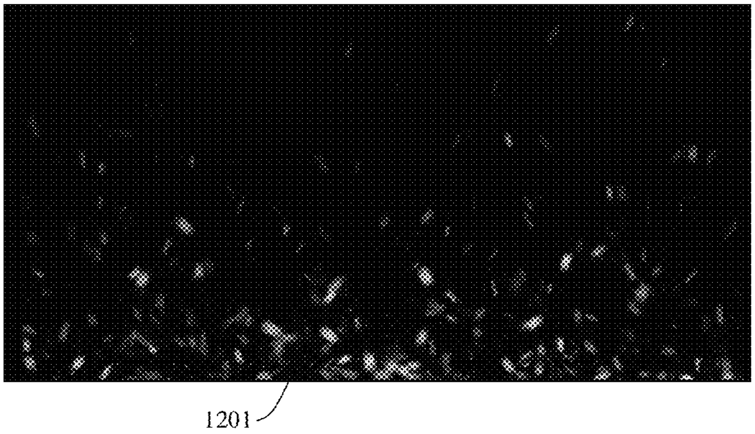
FIG. 12 is a schematic diagram of a particle special effect according to an embodiment of this disclosure.
Figure 13:
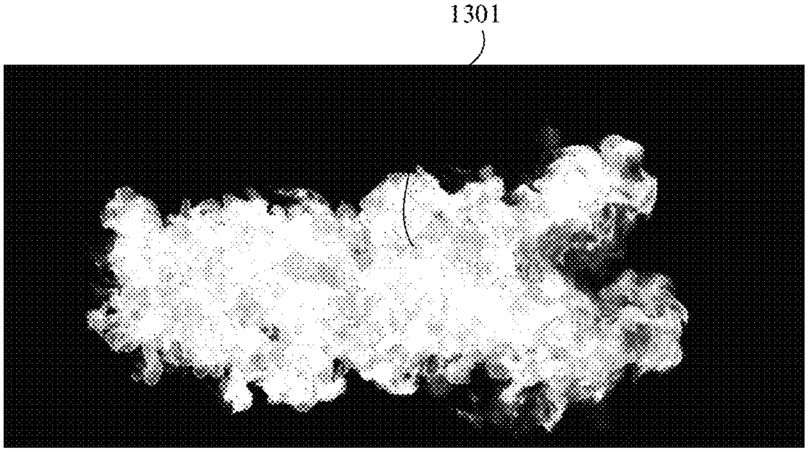
FIG. 13 is a schematic diagram of a flame special effect according to an embodiment of this disclosure.

According to the video processing method provided in the embodiments of this disclosure, at least production and display of a light and shadow special effect 1001 in FIG. 10, production and display of a game gift special effect (having an alpha transparent background) 1102 of a game gift 1101 in FIG. 11, production and display of a particle special effect 1201 in FIG. 12, and production and display of a flame special effect 1301 in FIG. 13 can be implemented.

Game rendering is actually rendering of each pixel point, and each pixel point is divided into four channels, to be specific, an R channel, a G channel, a B channel, and an alpha channel. RGB are color channels, and alpha is a transparency channel of a pixel. Alpha blending needs to be used in both specific effect rendering of the entire game and various cool animations, such as a light and shadow special effect.

The following describes why the alpha blending needs to be used in the special effects. For example, because all pictures are rectangular, if picture content is a circle, when such a picture is used, a background is actually blocked by the entire rectangle, rather than only a circle is displayed. At this time, the alpha channel needs to be used, so that all places around the circle are set to be transparent.

First, the video decoding and rendering procedure is briefly introduced. Video YUV data is obtained through hard decoding or soft decoding on an MP4 video file. Before rendering, the YUV data needs to be converted into an RGB data format, and then the RGB data is rendered and one frame of video picture is displayed. The embodiments of this disclosure are based on video technologies. Because the video data format is YUV, the MP4 video file cannot carry alpha transparency information. Therefore, in the embodiments of this disclosure, a space is additionally added to store the alpha transparency information. Therefore, the picture needs to be spliced into a video composed of an upper part and a lower part. During rendering, a corresponding alpha transparency value is obtained at a corresponding position, so that alpha blending rendering can be completed.

Figure 14:
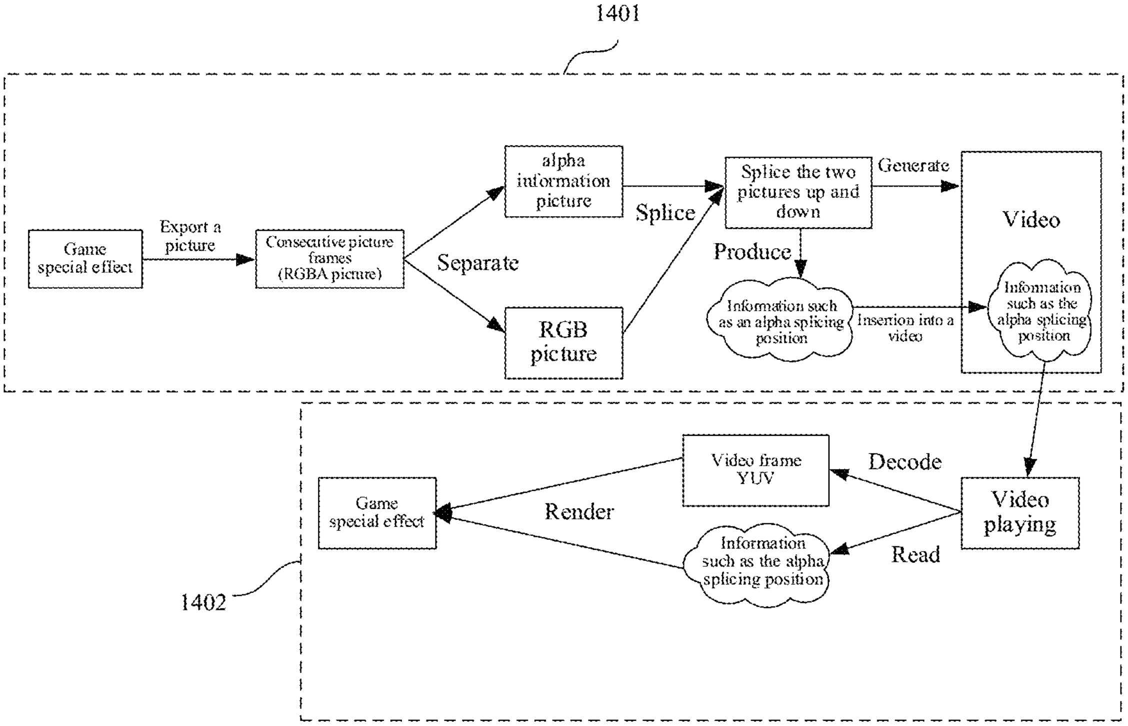
FIG. 14 is a schematic diagram of an entire procedure of a video processing method according to an embodiment of this disclosure.

The following describes an overall procedure of a video processing method provided in this embodiment of this disclosure. FIG. 14 is a schematic diagram of an entire procedure of a video processing method according to an embodiment of this disclosure. As shown in FIG. 14, a procedure of the entire solution is divided into two parts, to be specific, an alpha video production process 1401 and an alpha use process 1402. The alpha video production process is a process from a game special effect to alpha video generation, and the alpha use process is a process from alpha video decoding to rendering.

Figure 15:
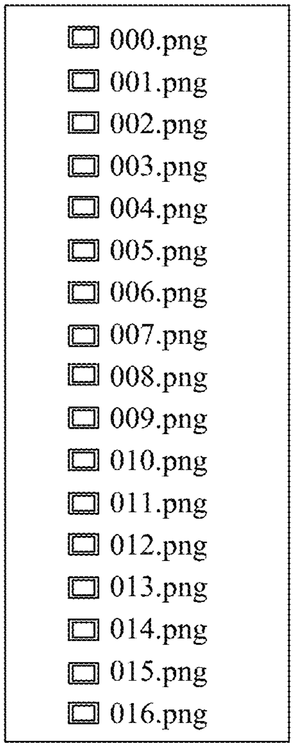
FIG. 15 is a schematic diagram of consecutive PNG pictures of a game special effect exported by using AE software according to an embodiment of this disclosure.

(1) In the alpha video production process 1401, consecutive PNG pictures of a game special effect are first exported by using AE software. FIG. 15 is a schematic diagram of consecutive PNG pictures of a game special effect exported by using AE software according to an embodiment of this disclosure. Each PNG picture includes alpha transparency information. The alpha transparency information is information stored in an A channel in RGBA of the picture, and represents transparency of the picture. 0 indicates fully transparent, and 255 indicates opaque.

Figure 16:
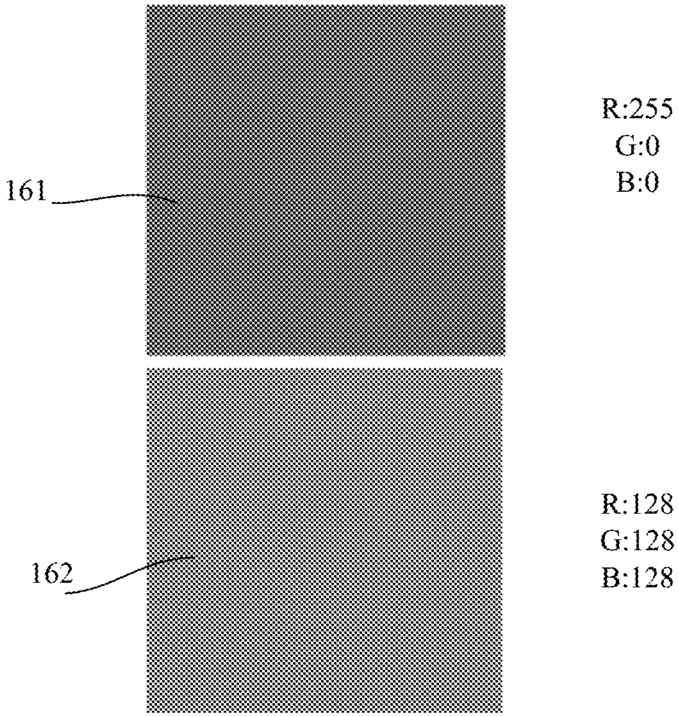
FIG. 16 is a schematic diagram of two pictures obtained by separating information of RGBA four channels according to an embodiment of this disclosure.

Then, each PNG picture is separated into two pictures, and information of RGBA four channels of the PNG picture may be divided into two parts, to be specific, an RGB part and an alpha part, and two pictures are formed. One picture is an RGB picture, and the other is an alpha information picture in which RGB channel values are all equal to an alpha transparency value. For example, if RGBA=(255, 0, 0, 128) of the PNG picture, the PNG picture is divided into two pictures with RGB=(255, 0, 0) and RGB=(128, 128, 128). As shown in FIG. 16, there are two pictures obtained through division, to be specific, an RGB picture 161 and an alpha picture 162.

Figure 17:
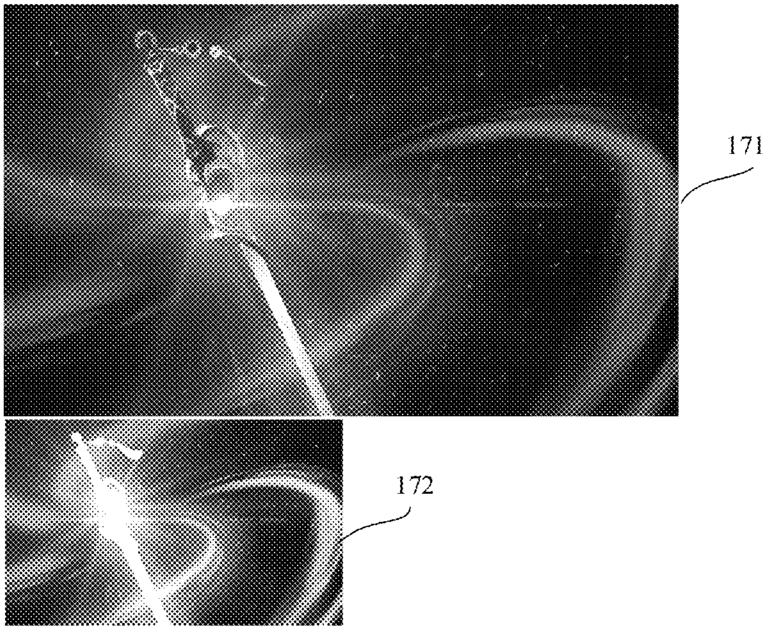
FIG. 17 is a schematic diagram of a spliced picture according to an embodiment of this disclosure.

Then, the two obtained pictures (to be specific, the RGB picture and the alpha picture in which the RGB channel values are all equal to the alpha transparency value) are spliced up and down (certainly, in other embodiments, splicing may be performed in other manners, and the picture may alternatively be zoomed. For example, a spliced picture shown in FIG. 17 is a picture formed by zooming the alpha picture by 0.5 times), to form a new PNG picture. As shown in FIG. 17, an RGB picture 171 is located at an upper half of the spliced picture, and a zoomed alpha picture 172 is located at a lower half of the spliced picture. In addition, information such as a position at which the spliced alpha picture is located, a height, and an offset value (a start position of the alpha picture in the entire spliced picture) is recorded, to form alpha configuration information (namely, the foregoing preset configuration information), and the alpha configuration information is retained in a JSON string form.

Because the PNG picture is a picture having the information of the RGBA four channels, the PNG picture is directly converted into the video, the YUV data is obtained by decoding the video by the player, the YUV data is converted into RGB data, and the alpha information is actually lost, the PNG picture needs to be divided into two pictures, and then spliced together to form one picture. Therefore, when the PNG picture is divided into two pictures and then spliced together to form one picture, the problem that the alpha information is lost can be resolved, and this is equivalent to adding a picture area to store the alpha information.

Figure 18:
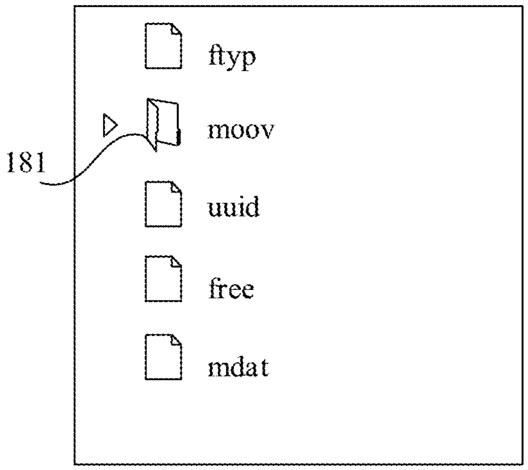
FIG. 18 is a schematic diagram of an insertion position of alpha configuration information according to an embodiment of this disclosure.

Finally, a plurality of spliced pictures after splicing are spliced into an MP4 video, and the alpha configuration information is inserted into the MP4 video. The alpha configuration information may be inserted into a second box position of an MP4 data header considering reading efficiency. FIG. 18 is a schematic diagram of an insertion position of alpha configuration information according to an embodiment of this disclosure. The alpha configuration information may be inserted into a moov box 181.

Because an MP4 format technology stack is mature and stable, and can be well supported at different system sides, there is no compatibility problem. Therefore, in this embodiment of this disclosure, the MP4 video format is selected as a carrier. Certainly, another video format may be selected as the carrier. In other words, a video in another video format is formed, and the alpha configuration information is inserted into a specific position of a data header in the another video format.

In this case, the alpha video (namely, the foregoing transparency spliced video) has been obtained. If an ordinary video player is used to play a file of the alpha video, the file can be played normally, but only the spliced video of the upper and lower splicing picture can be seen, and the special effect cannot be seen. Therefore, an alpha blending rendering technology needs to be used in a unified shader of a game application, to normally render the game special effect.

(2) In the alpha use process 1402, hardware decoding or software decoding is first performed on the alpha video (the video player is used to perform hard decoding or soft decoding), to obtain video frame YUV data. Then, the JSON string of the alpha configuration information is read from the second box in the alpha video file. Then, the video frame YUV data is converted into an RGB data format by using a conversion formula, where conversion between the YUV data format and the RGB data format is described in the following formulas (1) to (6);

conversion between the RGB data format and the YUV data format is described in the following formulas (1) to (3); and $$Y = 0.257R + 0.504G + 0.098B + 16 \quad (1)$$

$$Cr = V = 0.439R - 0.368G - 0.071B + 16 \quad (2)$$

$$Cb = U = -0.148R - 0.291G + 0.439B + 128 \quad (3)$$

conversion between the YUV data format and the RGB data format is described in the following formulas (4) to (6).

$$B = 1.164(Y - 16) + 2.018(U - 128) \quad (4)$$

$$G = 1.164(Y - 16) - 0.813(V - 128) - 0.391(U - 128) \quad (5)$$

$$R = 1.164(Y - 16) + 1.596(V - 128) \quad (6)$$

Figure 19:
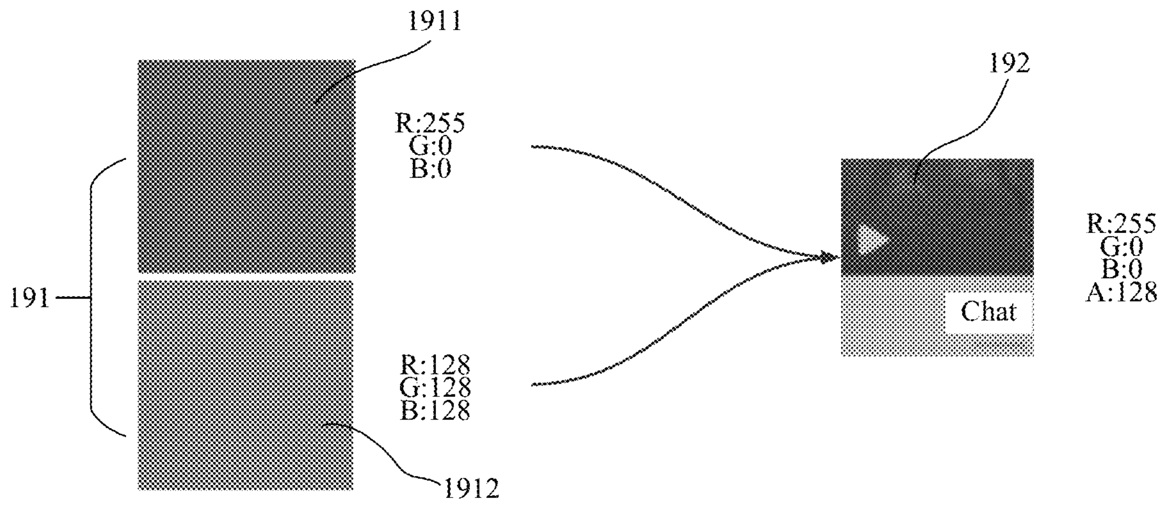
FIG. 19 is a schematic diagram of a rendering process according to an embodiment of this disclosure.

Then, the RGB data and the alpha data are needed when each pixel point is rendered. The RGB data is from the upper half of the video frame, and the alpha data is from the lower half of the video frame, but the two parts need to accurately align positions of the two pieces of data. When the two parts align the positions of the two pieces of data, the alpha configuration information read from the MP4 video needs to be used. The alpha configuration information includes information such as a width, a height, a margin, and a start offset position of the lower half of the video. In this way, the video is rendered into an RGBA four channels video frame (that is, a video frame of the transparency special effect video) and displayed on the screen. As shown in FIG. 19, in the rendering process, a video frame 192 of the transparency special effect video is rendered based on data in an RGB picture 1911 and data in an alpha picture 1912 in a spliced picture 191. In this case, the video frame 192 also has the transparency information.

According to the video processing method provided in the embodiments of this disclosure, a game special effect program can be developed more efficiently, the particle special effect is supported, and transparent background display is supported. In addition, the generated transparency special effect video file has small memory usage, and can be implemented through hardware decoding.

In the spliced image, the alpha data of the lower half may be further compressed. Therefore, there may be various shapes of splicing methods.

The video processing method in the embodiments of this disclosure uses the MP4 video as the carrier, fully utilizes the mature MP4 technology stack, and uses the alpha blending technology as a solution for game special effect rendering, which is a combination of the MP4 and the alpha rendering technologies. The alpha rendering technologies are implemented by using the unified shader, and are fully autonomously developed and tested. In a form of alpha data compression, an upper and lower splicing mode can be optimized to a degree in which the alpha data accounts for only one third of the data of the entire spliced picture.

In the embodiments of this disclosure, when the embodiments of this disclosure are applied to a specific product or technology, user permission or consent need to be obtained for data related to content of user information, such as information of an original special effect video, a color picture, a transparency picture, a transparency spliced video, or a transparency special effect video, or data related to the user information or enterprise information, such as collection, use, and processing of the related data need to comply with the laws, regulations, and standards of related countries and regions.

The following continues to describe an example structure in which implementation of a video processing apparatus 354 provided in the embodiments of this disclosure is a software module. In some embodiments, as shown in FIG. 6, the video processing apparatus 354 may include:

an obtaining module, configured to: obtain, for each original video frame of an original special effect video, color channel information of each pixel point and transparency channel information of each pixel point in the original video frame; a picture generation module, configured to draw a color picture corresponding to the original video frame based on the color channel information of each pixel point in the original video frame, and drawing a transparency picture corresponding to the original video frame based on the transparency channel information of each pixel point in the original video frame; a splicing processing module, configured to perform splicing processing on the color picture and the transparency picture of each original video frame based on preset configuration information, to obtain at least one spliced picture; a video conversion module, configured to perform video conversion processing on the at least one spliced picture, to obtain a transparency spliced video; and a rendering module, configured to perform special effect video rendering based on the preset configuration information and the transparency spliced video, to obtain a transparency special effect video.

In some embodiments, the picture generation module is further configured to: add the color channel information of each pixel point in the original video frame to a color channel of a first canvas picture, to obtain the color picture corresponding to the original video frame; and add the transparency channel information of each pixel point in the original video frame to a color channel of a second canvas picture, to obtain the transparency picture corresponding to the original video frame, each of the first canvas picture and the second canvas picture being a blank canvas to which pixel value information of any pixel point is not added.

In some embodiments, the color channel information includes RGB channel values, and the transparency channel information includes a transparency value. The picture generation module is further configured to: add RGB channel values of each pixel point in the original video frame to RGB channels of the first canvas picture, to obtain the color picture corresponding to the original video frame; and adding a transparency value of each pixel point in the original video frame to RGB channels of the second canvas picture, to obtain the transparency picture corresponding to the original video frame.

In some embodiments, the preset configuration information includes at least one of the following: first position information of the transparency picture in a spliced canvas, a size parameter of the transparency picture, and an offset value of the transparency picture; and the splicing processing module is further configured to: determine a start position of the transparency picture in the spliced canvas and a zoom ratio of the transparency picture based on the first position information of the transparency picture in the spliced canvas, the size parameter of the transparency picture, and the offset value of the transparency picture; obtain second position information of the color picture in the spliced canvas; and add the color picture and the transparency picture of each original video frame to the spliced canvas based on the second position information, the start position, and the zoom ratio, to form the at least one spliced picture.

In some embodiments, the splicing processing module is further configured to: determine the start position of the transparency picture in the spliced canvas based on the first position information of the transparency picture in the spliced canvas and the size parameter of the transparency picture; and determine the zoom ratio of the transparency picture based on the size parameter of the transparency picture and the offset value of the transparency picture.

In some embodiments, the splicing processing module is further configured to: add, for each original video frame, the color picture to a position corresponding to the second position information in the spliced canvas, to obtain the spliced canvas having the color picture; perform zoom processing on the transparency picture based on the zoom ratio, to obtain a zoomed transparency picture; and add the zoomed transparency picture to the spliced canvas having the color picture by using the start position as a start adding position of the zoomed transparency picture, to obtain the spliced picture.

In some embodiments, the transparency spliced video corresponds to a video compression encoding format. The apparatus further includes: an information obtaining module, configured to obtain the first position information of the transparency picture in the spliced canvas, the size parameter of the transparency picture, and the offset value of the transparency picture; a format conversion module, configured to perform data format conversion on the first position information of the transparency picture in the spliced canvas, the size parameter of the transparency picture, and the offset value of the transparency picture based on a preset data storage format, to obtain a configuration information string; and an insertion module, configured to insert the configuration information string into a preset position of a data header in the video compression encoding format.

In some embodiments, the apparatus further includes: a string obtaining module, configured to obtain the configuration information string from the preset position of the data header before performing splicing processing on the color picture and the transparency picture of each original video frame based on the preset configuration information; and a string parsing module, configured to perform string parsing on the configuration information string, to obtain the preset configuration information.

In some embodiments, the rendering module is further configured to: perform video decoding on the transparency spliced video, to obtain decoded format data of each spliced picture in the transparency spliced video; perform data format conversion on the decoded format data of each spliced picture, to obtain color format data of each spliced picture, the color format data including a color channel data part and a transparency channel data part; and perform special effect video rendering based on the preset configuration information and the color channel data part and the transparency channel data part of the spliced picture, to obtain the transparency special effect video.

In some embodiments, the rendering module is further configured to: determine, based on the preset configuration information, a mapping relationship between each piece of color channel sub-data in the color channel data part and each transparency channel sub-data in the transparency channel data part; determine the color channel sub-data and the transparency channel sub-data that have the mapping relationship as channel data of a same pixel point; determine position information of the color channel sub-data in the channel data of each pixel point in the color picture as position information of the pixel point; and perform special effect video rendering on the channel data of each pixel point based on the position information of each pixel point, to obtain the transparency special effect video.

In some embodiments, the apparatus further includes: a background video rendering module, configured to render a background video of a currently running application; and a video adding module, configured to add the transparency special effect video to a specific position of the background video in response to a special effect triggering operation.

Descriptions of the apparatus in the embodiments of this disclosure are similar to the descriptions of the foregoing method embodiments, and have beneficial effects similar to the beneficial effects of the method embodiments. Therefore, details are not described herein again. For technical details not disclosed in the apparatus embodiments, refer to descriptions in the method embodiments of this disclosure for understanding.

Embodiments of this disclosure provide a computer program product or a computer program, the computer program product or the computer program including executable instructions, the executable instructions are a type of computer-executable instructions, and the executable instructions being stored in a computer-readable storage medium. When a processor of an electronic device reads the executable instructions from the computer-readable storage medium, and the processor executes the executable instructions, the electronic device executes the method provided in the embodiments of this disclosure.

Embodiments of this disclosure provide a storage medium of executable instructions, having the executable instructions stored therein. When the executable instructions are executed by a processor, the processor is caused to execute the method provided in the embodiments of this disclosure, for example, the method shown in FIG. 7.

In some embodiments, the storage medium may be a computer-readable storage medium, for example, may be a memory such as a ferromagnetic random access memory (FRAM), a read only memory (ROM), a programmable read only memory (PROM), an erasable programmable read only memory (EPROM), an electrically erasable programmable read only memory (EEPROM), a flash, a magnetic surface memory, an optical disc, or a compact disk-read only memory (CD-ROM), or may be various devices including one or any combination of the foregoing memories.

In some embodiments, the executable instructions may be written in form of programming language (including a compiled or interpreted language, or a declarative or procedural language) in a form of a program, software, a software module, a script, or code, and may be deployed in any form, including being deployed as an independent program or being deployed as a module, a component, a subroutine, or another unit applicable for use in a computing environment.

For example, the executable instructions may, but do not necessarily correspond to a file in a file system, and may be stored as a part of a file that saves another program or data, for example, stored in one or more scripts in a hyper text markup language (HTML) file, stored in a single file dedicated to a program in discussion, or stored in a plurality of collaborative files (for example, files that store one or more modules, subprograms, or code parts). For example, the executable instructions may be deployed to be executed on one electronic device, or executed on a plurality of electronic devices located at one location, or executed on a plurality of electronic devices that are distributed in a plurality of locations and interconnected by a communication network.

The foregoing descriptions described above are merely examples of the embodiments of this disclosure, and this is not intended to limit the protection scope of this disclosure. Any modification, equivalent replacement, and improvement made within the spirit and scope of this disclosure shall fall within the protection scope of this disclosure.

What is claimed is:

1. A video processing method, the method comprising:

obtaining, by an electronic device, color information and transparency information of each pixel in a video frame of a video;

generating a color picture corresponding to the video frame based on the color information, and generating a transparency picture corresponding to the video frame based on the transparency information;

obtaining at least one spliced picture based on splicing processing of the color picture and the transparency picture such that the transparency picture and the color picture are arranged at preset positions in the at least one spliced picture according to preset configuration information, the preset configuration information being stored in a preset position of a data header of a transparency spliced video, the preset configuration information indicating the preset positions of the transparency picture and the color picture in the at least one spliced picture;

performing video conversion processing on the at least one spliced picture, to obtain the transparency spliced video;

performing special effect video rendering based on the preset configuration information and the transparency spliced video, to obtain a transparency special effect video; and applying the transparency special effect video to a specific position of an application in response to a special effect triggering operation.

2. The method according to claim 1, the method further comprises:

performing video decoding on the transparency spliced video, to obtain decoded format data of each spliced picture in the transparency spliced video;

performing data format conversion on the decoded format data, to obtain color format data of each spliced picture, the color format data includes a color data part and a transparency data part; and performing the special effect video rendering based on the preset configuration information and the color data part and the transparency data part of the at least one spliced picture, to obtain the transparency special effect video.

3. The method according to claim 2, the method further comprises:

determining, based on the preset configuration information, a mapping relationship between each color sub-data in the color data part and each transparency sub-data in the transparency data part;

determining the color sub-data and the transparency sub-data that have the mapping relationship of a same pixel;

determining position information of the color sub-data of each pixel in the color picture as position information of the pixel; and performing special effect video rendering of each pixel based on the position information, to obtain the transparency special effect video.

4. A video processing apparatus, the apparatus comprising:

processing circuitry configured to:

obtain color information of each pixel and transparency information of each pixel in a video frame of a video;

generate a color picture corresponding to the video frame based on the color information, and generate a transparency picture corresponding to the video frame based on the transparency information;

obtain at least one spliced picture based on splicing processing of the color picture and the transparency picture such that the transparency picture and the color picture are arranged at preset positions in the at least one spliced picture according to preset configuration information, the preset configuration information being stored in a preset position of a data header of a transparency spliced video, the preset configuration information indicating the preset positions of the transparency picture and the color picture in the at least one spliced picture;

perform video conversion processing on the at least one spliced picture, to obtain the transparency spliced video;

perform special effect video rendering based on the preset configuration information and the transparency spliced video, to obtain a transparency special effect video; and apply the transparency special effect video to a specific position of an application in response to a special effect triggering operation.

5. The apparatus according to claim 4, wherein the processing circuitry is configured to:

perform video decoding on the transparency spliced video, to obtain decoded format data of each spliced picture in the transparency spliced video;

perform data format conversion on the decoded format data, to obtain color format data of each spliced picture, the color format data includes a color data part and a transparency data part; and perform the special effect video rendering based on the preset configuration information and the color data part and the transparency data part of the at least one spliced picture, to obtain the transparency special effect video.

6. The apparatus according to claim 5, wherein the processing circuitry is configured to:

determine, based on the preset configuration information, a mapping relationship between each color sub-data in the color data part and each transparency sub-data in the transparency data part;

determine the color sub-data and the transparency sub-data that have the mapping relationship of a same pixel;

determine position information of the color sub-data of each pixel in the color picture as position information of the pixel; and perform special effect video rendering of each pixel based on the position information, to obtain the transparency special effect video.

7. A non-transitory computer-readable storage medium, storing instructions which when executed by a processor cause the processor to perform:

obtaining, by an electronic device, color information and transparency information of each pixel in a video frame of a video;

generating a color picture corresponding to the video frame based on the color information, and generating a transparency picture corresponding to the video frame based on the transparency information;

obtaining at least one spliced picture based on splicing processing of the color picture and the transparency picture such that the transparency picture and the color picture are arranged at preset positions in the at least one spliced picture according to preset configuration information, the preset configuration information being stored in a preset position of a data header of a transparency spliced video, the preset configuration information indicating the preset positions of the transparency picture and the color picture in the at least one spliced picture;

performing video conversion processing on the at least one spliced picture, to obtain the transparency spliced video;

performing special effect video rendering based on the preset configuration information and the transparency spliced video, to obtain a transparency special effect video; and applying the transparency special effect video to a specific position of an application in response to a special effect triggering operation.

8. The non-transitory computer-readable storage medium according to claim 7, wherein the instructions when executed by the processor further cause the processor to perform:

performing video decoding on the transparency spliced video, to obtain decoded format data of each spliced picture in the transparency spliced video;

performing data format conversion on the decoded format data, to obtain color format data of each spliced picture, the color format data includes a color data part and a transparency data part; and performing the special effect video rendering based on the preset configuration information and the color data part and the transparency data part of the at least one spliced picture, to obtain the transparency special effect video.

9. The non-transitory computer-readable storage medium according to claim 8, wherein the instructions when executed by the processor further cause the processor to perform:

determining, based on the preset configuration information, a mapping relationship between each piece of color sub-data in the color data part and each transparency sub-data in the transparency data part;

determining the color sub-data and the transparency sub-data that have the mapping relationship of a same pixel;

determining position information of the color sub-data of each pixel in the color picture as position information of the pixel; and performing special effect video rendering of each pixel based on the position information of each pixel, to obtain the transparency special effect video.

* * * * *